(12) United States Patent
Renna

(10) Patent No.: US 11,331,792 B2
(45) Date of Patent: May 17, 2022

(54) ELECTROMAGNETIC ACTUATOR FOR ARTIFICIAL MUSCLE FIBERS AND A METHOD OF MANUFACTURE THEREOF

(71) Applicant: STMicroelectronics S.r.l., Agrate Brianza (IT)

(72) Inventor: Lucio Renna, Acireale (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 470 days.

(21) Appl. No.: 16/239,211

(22) Filed: Jan. 3, 2019

(65) Prior Publication Data
US 2020/0220444 A1 Jul. 9, 2020

(51) Int. Cl.
| | | |
|---|---|---|
| B25J 9/10 | (2006.01) | |
| H02K 41/03 | (2006.01) | |
| H02K 15/02 | (2006.01) | |
| H02K 11/33 | (2016.01) | |
| B25J 9/12 | (2006.01) | |

(52) U.S. Cl.
CPC ............. B25J 9/1075 (2013.01); B25J 9/12 (2013.01); B25J 9/123 (2013.01); H02K 11/33 (2016.01); H02K 15/02 (2013.01); H02K 41/03 (2013.01)

(58) Field of Classification Search
CPC ...... A61F 2/08; B25J 9/12; B25J 9/123; B25J 9/1075; H02K 3/24; H02K 9/19; H02K 11/33; H02K 15/065; H02K 41/00–065; H02K 2203/15; H02K 11/30; H02K 15/02

USPC ........................................................ 74/490.1
See application file for complete search history.

(56) References Cited

U.S. PATENT DOCUMENTS

| | | | | |
|---|---|---|---|---|
| 7,218,017 | B1* | 5/2007 | Chitayat | H02K 21/14 310/12.19 |
| 7,898,119 | B2* | 3/2011 | Sato | G03F 7/70758 310/12.05 |
| 2010/0117367 | A1* | 5/2010 | Muller | H02K 55/04 290/53 |
| 2011/0109173 | A1* | 5/2011 | Sugita | H02K 33/16 310/12.18 |
| 2014/0340182 | A1* | 11/2014 | Dupraz | H02K 33/00 335/68 |
| 2020/0044549 | A1* | 2/2020 | Williams | H02K 41/0356 |

OTHER PUBLICATIONS

Dixit, Pradeep et al., "Fabrication of High Aspect Ratio 34 um Pitch Through-Wafer Copper Interconnects by Electroplating for 3-D Wafer Stacking," Electrochemical and Solid-State Letters, 9 (10), Aug. 2006, G305-G308.

(Continued)

*Primary Examiner* — Rashad H Johnson
(74) *Attorney, Agent, or Firm* — Slater Matsil, LLP

(57) ABSTRACT

An artificial muscle fiber includes an external fiber and an internal fiber. The external fiber includes a first linear array of actuators having protrusions directed in a first direction. The internal fiber includes a second linear array of actuators having protrusions directed in a second direction opposite to the first direction. Protrusions of the first linear array of actuators and protrusions of the second linear array of actuators are separated by a non-zero gap, and each actuator of the first linear array of actuators and the second linear array of actuators includes a soft magnetic material.

20 Claims, 22 Drawing Sheets

(56) References Cited

OTHER PUBLICATIONS

Eitel, Elisabeth "The Rise of Soft Robots and the Actuators that Drive Them," Robotics Industry Focus, Machine Design, eeitel@penton.com, Sep. 19, 2013, pp. 30-36.

Urban, Christian et al., "Development of a Bendable Permanent-Magnet Tubular Linear Motor," IEEE Transactions on Magnetics, vol. 48, No. 8, Aug. 2012, pp. 2367-2373.

Kong, Kyoungchul et al., "A Compact Rotary Series Elastic Actuator for Knee Joint Assistive System," IEEE International Conference on Robotics and Automation, Achorage Convention District, May 3-8, 2010; pp. 2940-2945.

Leel, Arnaldo Gomes Jr., "Series Elastic Actuator: Design, Analysis and Comparison," INTECH open science | open minds, World's largest Science, Technlogy & Medicine Open Access Book published, book.department@intechopen.com, dx.doi.org/10.5772/63573, Apr. 2016. 33 pages.

Veale, Allan Joshua et al., "Towards compliant and wearable robotic orthoses: A review of current and emerging actuator technologies," Medical Engineering and Physics, 38, www.elsevier.com/locate/medengphy, Jan. 31, 2016, pp. 317-325.

\* cited by examiner

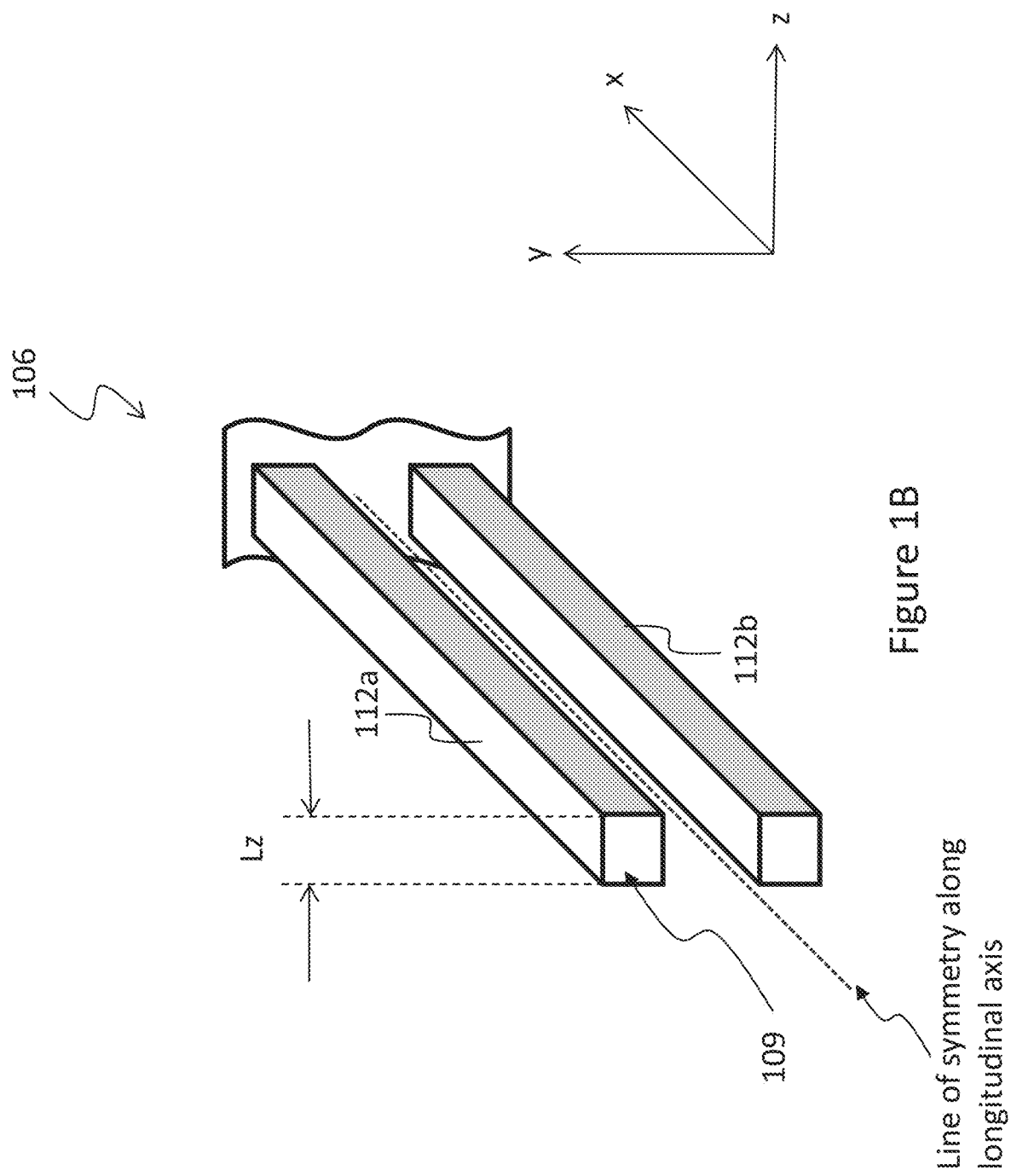

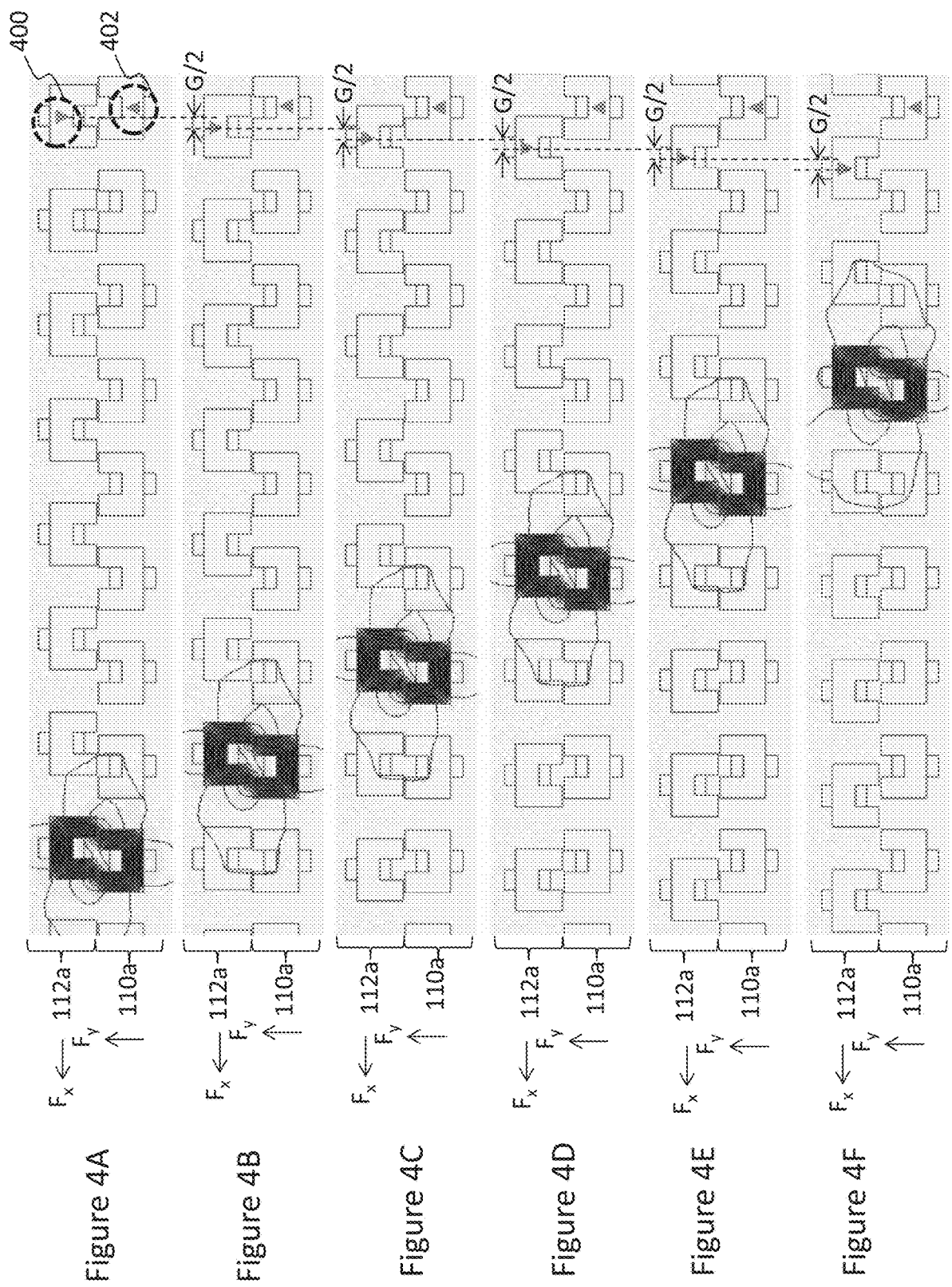

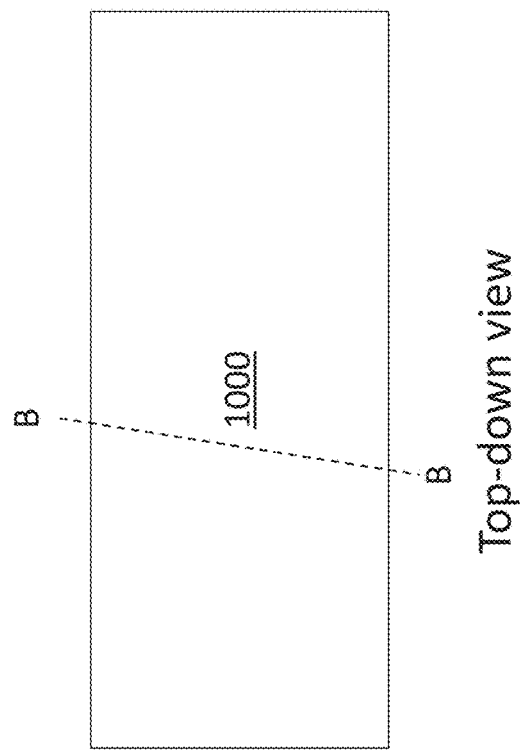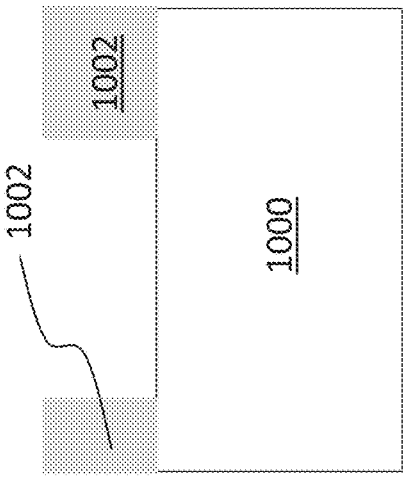
Figure 10A
Figure 10B

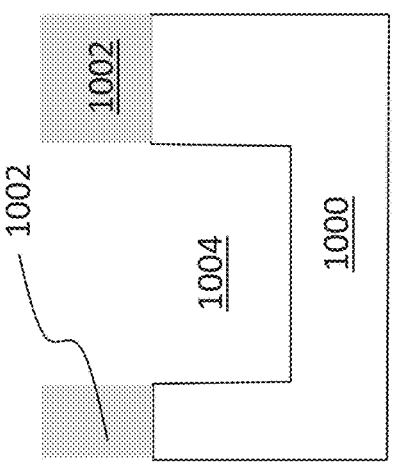
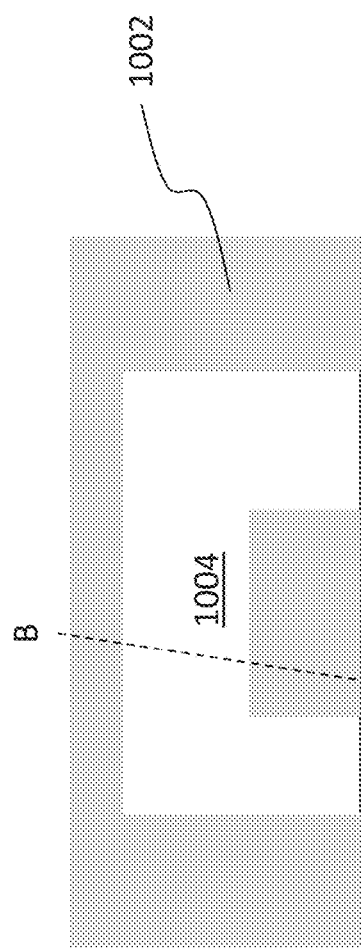
Figure 10C
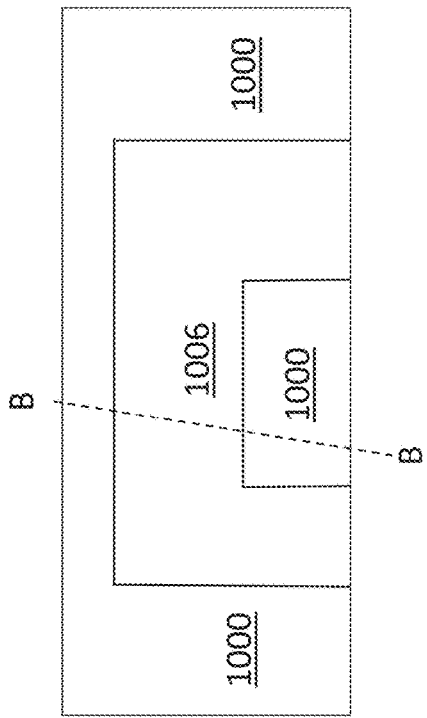
Figure 10D

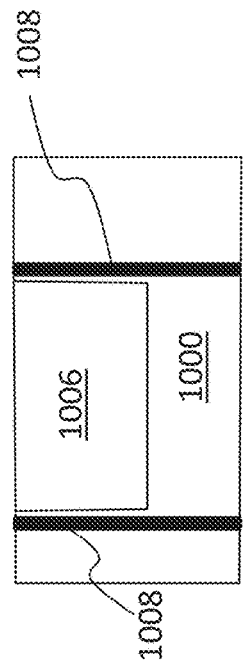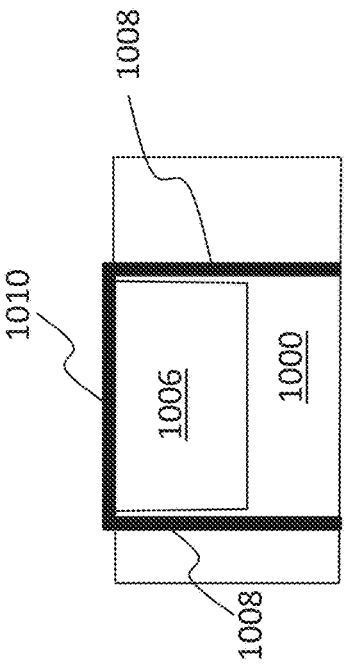
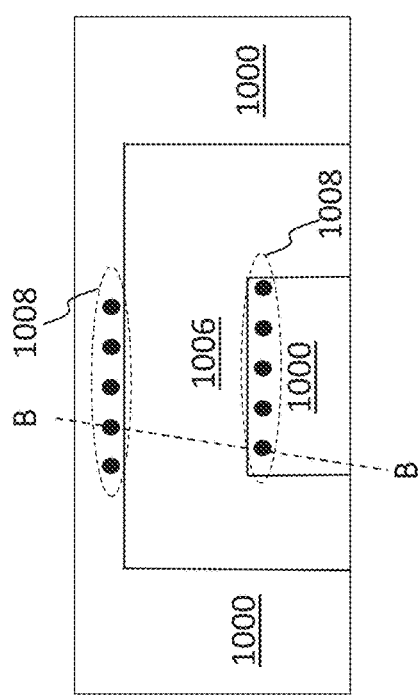
Figure 10E
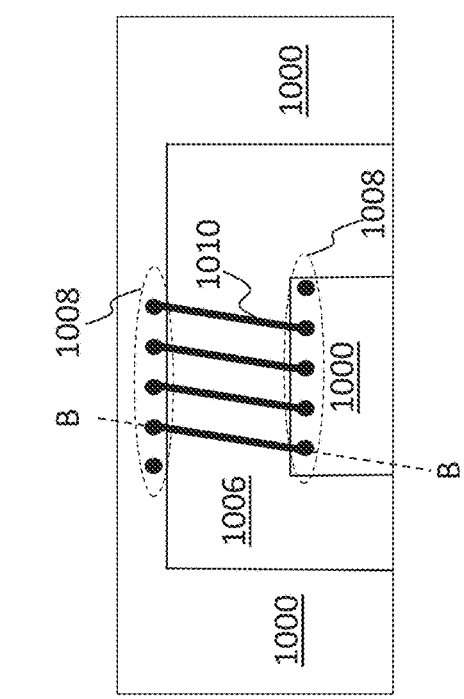
Figure 10F

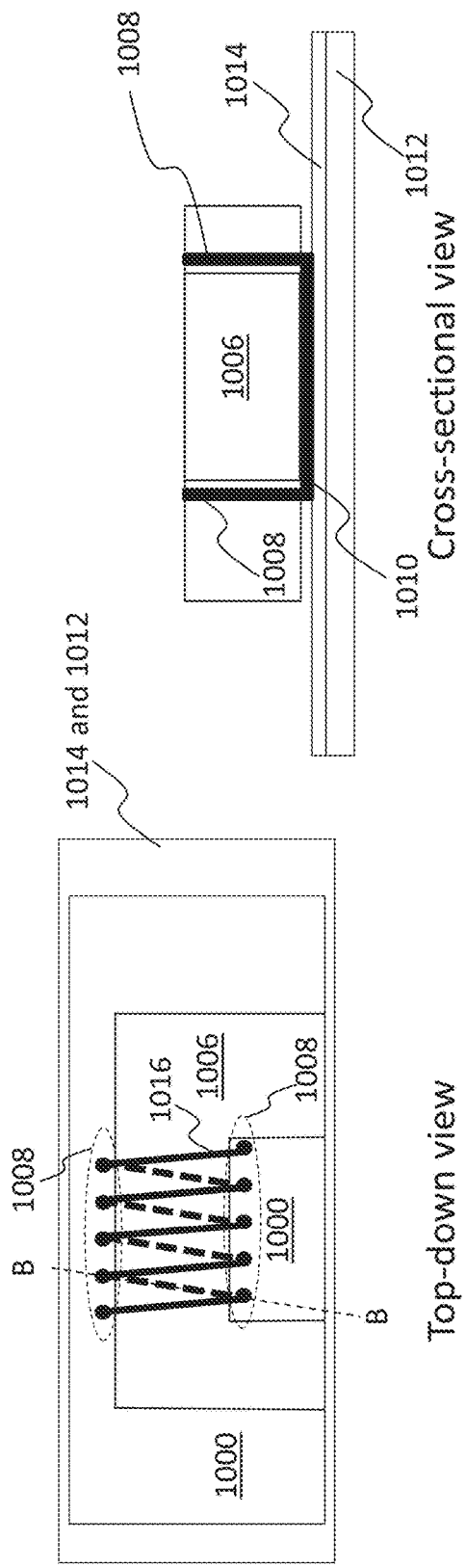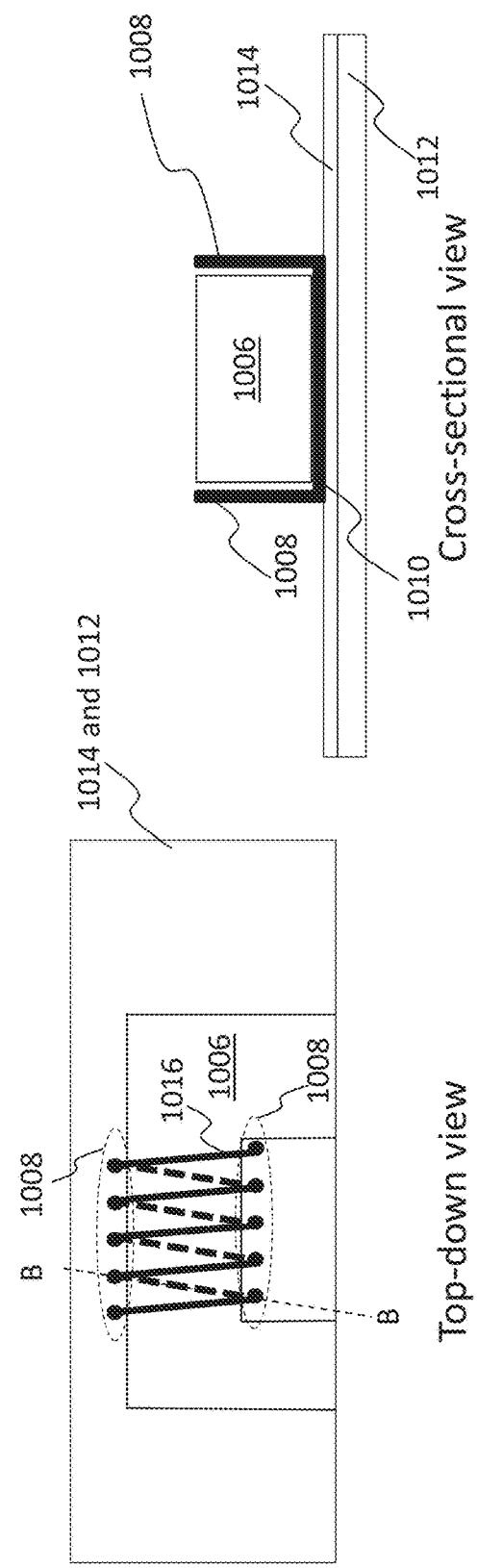
Figure 10I
Figure 10J

ELECTROMAGNETIC ACTUATOR FOR ARTIFICIAL MUSCLE FIBERS AND A METHOD OF MANUFACTURE THEREOF

TECHNICAL FIELD

This disclosure relates generally to artificial muscle fibers and, in particular embodiments, to an electromagnetic actuator for artificial muscle fibers and a method of manufacture thereof.

BACKGROUND

Actuators are needed in robotics applications, and there is wide development of artificial muscles fibers based on various actuators technologies. Stiff motion actuators remain at their reached position, while soft or compliant actuators allow deviations from its own equilibrium position. Typical actuators also make use of permanent magnets.

Several parameters are normally taken into account, in trying to develop actuators for robotics applications. Some of them can be directly compared with biological muscle performances, like stress, stroke, speed, etc., while others (e.g. applied voltage, motion control, production method, etc.) expand the benchmark of various actuators and identify possible application areas. Improved actuation of artificial muscles fibers may be needed.

SUMMARY

In an embodiment, an artificial muscle fiber includes: an external fiber including a first linear array of actuators having protrusions directed in a first direction; and an internal fiber including a second linear array of actuators having protrusions directed in a second direction opposite to the first direction, wherein protrusions of the first linear array of actuators and protrusions of the second linear array of actuators are separated by a non-zero gap, and wherein each actuator of the first linear array of actuators and the second linear array of actuators includes a soft magnetic material.

In an embodiment, an artificial muscle fiber includes an internal fiber and an external fiber. The internal fiber includes: a first flexible tape; a first array of actuators protruding in a first direction from a major surface of the first flexible tape; and a second array of actuators protruding in a second direction from the major surface of the first flexible tape, wherein the first direction is opposite to the second direction. The external fiber includes: an opening within which a portion of the internal fiber is positioned; a second flexible tape defining a first sidewall of the opening; a third flexible tape defining a second sidewall of the opening; a first array of actuators protruding in the second direction from a major surface of the second flexible tape towards the first array of actuators of the internal fiber; and a second array of actuators protruding in the first direction from a major surface of the third flexible tape towards the second array of actuators of the internal fiber.

In an embodiment, a method of manufacturing an actuator includes: etching a trench in a semiconductor substrate; depositing a soft magnetic material into the trench, wherein a frontside of the semiconductor substrate and a frontside of the soft magnetic material are substantially flush; forming a first plurality of vias filled with a conductive material next to a first sidewall of the soft magnetic material; forming a second plurality of vias filled with the conductive material next to a second sidewall of the soft magnetic material opposite the first sidewall; forming a first plurality of wires on the frontside of the soft magnetic material to interconnect the first plurality of vias and the second plurality of vias, the forming producing an intermediate structure; flipping the intermediate structure to expose a backside of the semiconductor substrate; planarizing the backside of the semiconductor substrate to expose a backside of the soft magnetic material; and forming a second plurality of wires on the backside of the soft magnetic material to interconnect the first plurality of vias and the second plurality of vias.

BRIEF DESCRIPTION OF THE DRAWINGS

For a more complete understanding of the present invention, and the advantages thereof, reference is now made to the following descriptions taken in conjunction with the accompanying drawings, in which:

FIG. 1B shows a three-dimensional cutaway view of a portion of the external fiber of the artificial muscle fiber of FIG. 1A, in accordance with an embodiment of the present disclosure;

FIGS. 4A to 4F illustrate motion generated by a switching sequence applied to actuators of an artificial muscle fiber, in accordance with an embodiment of the present disclosure;

FIGS. 10A to 10J illustrate a method of manufacturing an actuator of an artificial muscle fiber, in accordance with an embodiment of the present disclosure;

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of various embodiments are discussed in detail below. It should be appreciated, however, that the various embodiments described herein are applicable in a wide variety of specific contexts. The specific embodiments discussed are merely illustrative of specific ways to make and use various embodiments, and should not be construed in a limited scope.

Artificial muscle fibers and compliant actuators are widely used in robotics applications (e.g. in industry, household appliances, prosthetic devices, wearable robotics, or robotic anthropomorphization, to name a few). This disclosure presents an electromagnetic actuator for artificial muscle fibers and a method of manufacture thereof. In particular, an electromagnetic actuator based on a linear synchronous motor is presented. The electromagnetic actuator is designed to be modular, scalable, and does not use permanent magnets. The characteristics of the proposed electromagnetic actuator (e.g. in terms of force, stroke and other performance features) are matched with parameters of natural muscles. Besides performance, design choices of the proposed device have been driven by the desire to achieve high throughput production processes. Therefore, a simple repetitive flat structure has been chosen for the proposed electromagnetic actuator, with the goal of easy manufacturing based on assembly automated production machines. Further, when down-scaling is necessary to build sub-millimetric sectional fibers, a method of manufacturing the disclosed electromagnetic actuator, based on integrated circuits technology is proposed to achieve high levels of integration and production throughput.

Figure 1A:
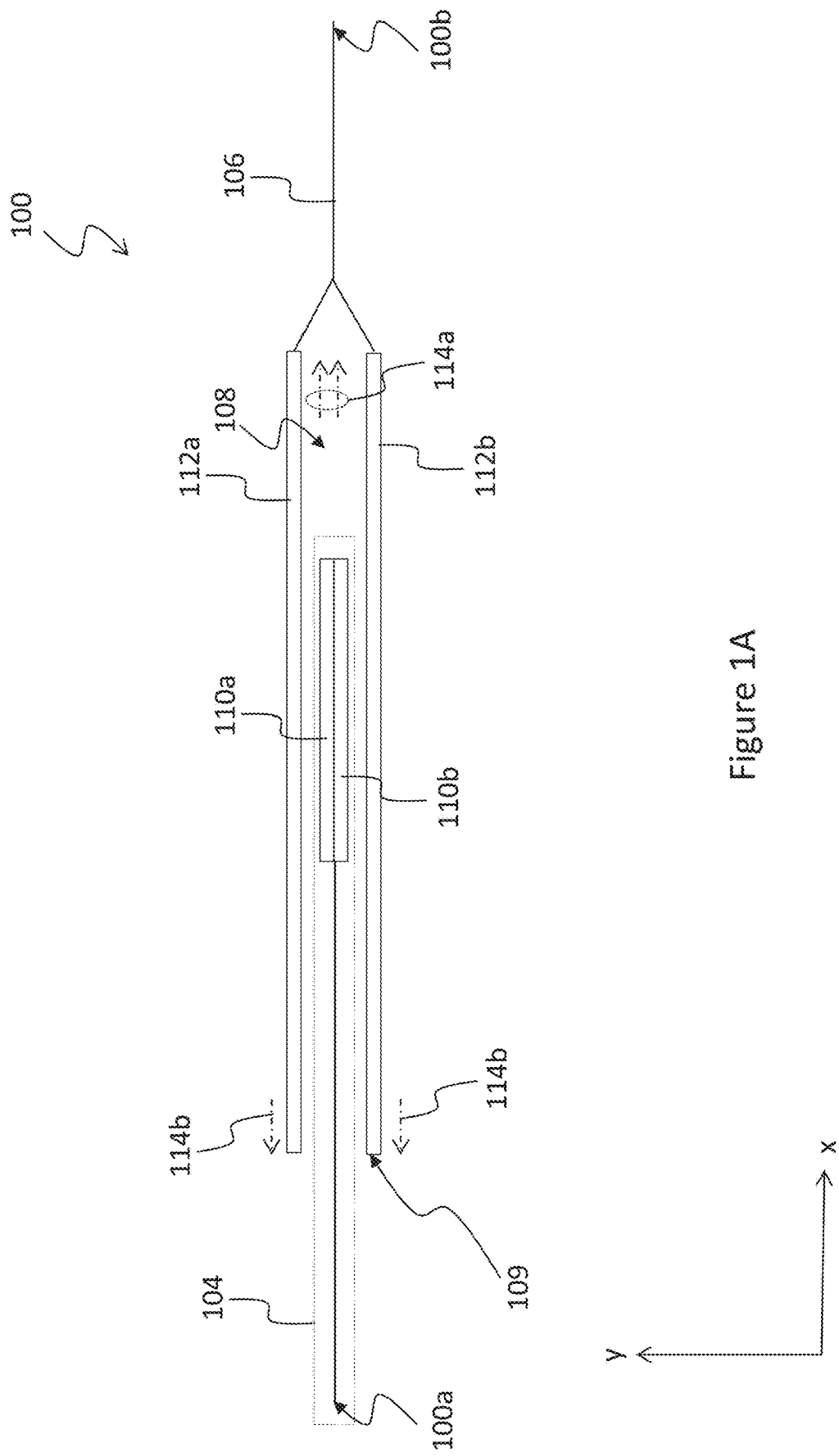
FIG. 1A shows a simplified schematic diagram of an artificial muscle fiber including an internal fiber and an external fiber, in accordance with an embodiment of the present disclosure.
Figure 1C:
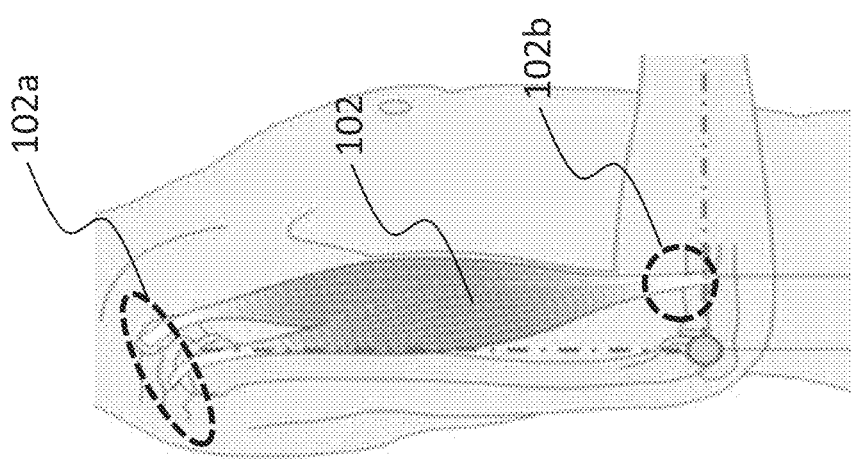
FIG. 1C shows a simplified diagram of a human bicep muscle.

FIG. 1A shows a simplified schematic diagram of an artificial muscle fiber 100, in accordance with an embodiment of the present disclosure. FIG. 1A presents a two-dimensional longitudinal view of the artificial muscle fiber 100 in the x-y plane and where the artificial muscle fiber 100 includes an internal fiber 104 and an external fiber 106. FIG. 1B shows a three-dimensional cutaway view of a portion of the external fiber 106 in order to provide further insight into the spatial distribution of the various parts of the artificial muscle fiber 100 shown in FIG. 1A. It is noted that the parts of the artificial muscle fiber 100 are generally indicated in FIGS. 1A and 1B as blocks, and further detail regarding the parts of the artificial muscle fiber 100 are provided in FIGS. 2A to 2D. As described above, the artificial muscle fiber 100 may mimic the movement, force, and stroke of a human muscle (e.g. human bicep muscle 102 shown in FIG. 1C).

At least a portion of the internal fiber 104 may be positioned within or inserted into the external fiber 106, for example in an opening 108 of the external fiber 106. In a similar manner the human bicep muscle 102 is fixed to the human skeleton arm through tendons 102a, 102b (e.g. shown in FIG. 1C), a first end 100a of the artificial muscle fiber 100 may be fixed (e.g. via a bonded wire) to a first load, while a second end 100b of the artificial muscle fiber 100 may be fixed (e.g. via a bonded wire) to a second load. The first load and the second load are not shown in FIG. 1A for the sake of simplicity and clarity. The first end 100a of the artificial muscle fiber 100 may correspond to an end portion of the internal fiber 104 farthest from the mouth 109 of the opening 108, while the second end 100b of the artificial muscle fiber 100 may correspond to an end portion of the external fiber 106 farthest from the mouth 109 of the opening 108.

The internal fiber 104 includes a first array of actuators 110a and a second array of actuators 110b formed at a portion of the internal fiber 104 opposite the first end 100a of the artificial muscle fiber 100. The first array of actuators 110a and the second array of actuators 110b are configured to be positioned within the opening 108 of the external fiber 106. The external fiber 106 also includes a first array of actuators 12a and a second array of actuators 112b that define the opening 108. The actuators of the first array of actuators 110a of the internal fiber 104 face the actuators of the first array of actuators 112a of the external fiber 106. Furthermore, the actuators of the second array of actuators 110b of the internal fiber 104 face the actuators of the second array of actuators 112b of the external fiber 106. Stated differently, the artificial muscle fiber 100 includes an outer double strip made of two parallel actuator arrays 112a, 112b and an inner double strip made up of two parallel actuator arrays 110a, 110b on a portion of its length.

Each actuator of the arrays 110a, 110b, 112a, 112b may be identical in size (e.g. as discussed below in reference to FIG. 3). However, as shown in FIG. 1A, the first array of actuators 112a and the second array of actuators 112b of the external fiber 106 are greater in extent than the first array of actuators 110a and the second array of actuators 110b of the internal fiber 104. This implies that the first array of actuators 112a and the second array of actuators 112b of the external fiber 106 includes a greater number of actuators than the first array of actuators 110a and the second array of actuators 110b of the internal fiber 104.

The array of actuators 112a, 112b of the external fiber 106 and the array of actuators 110a, 110b of the internal fiber 104 cooperatively function as a linear synchronous motor. As an example, the array of actuators 112a, 112b of the external fiber 106 and the array of actuators 110a, 110b of the internal fiber 104 interact to generate forces that decrease the linear distance between the opposing ends 100a, 100b of the artificial muscle fiber 100 (e.g. mimicking contraction of a human muscle). Illustratively, forces 114a are generated in the internal fiber 104 that pull the internal fiber 104 into the opening 108 of the external fiber 106 and forces 114b are generated in the external fiber 106 that move the mouth 109 of the opening 108 of the external fiber 106 toward the first end 100a of the artificial muscle fiber 100.

Figure 2A:
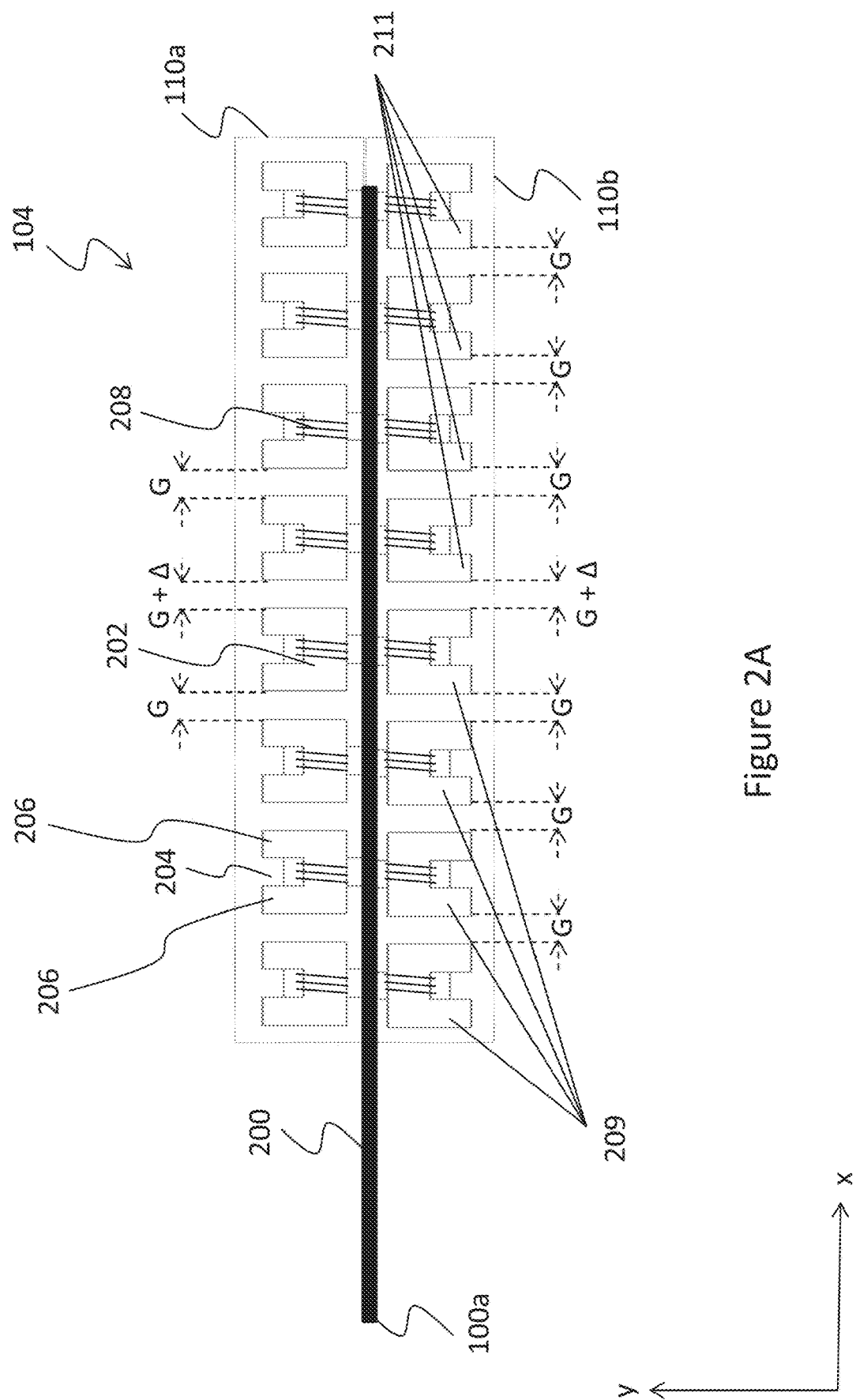
FIGS. 2A to 2D show a detailed schematic diagram of an artificial muscle fiber, in accordance with an embodiment of the present disclosure.
Figure 2B:
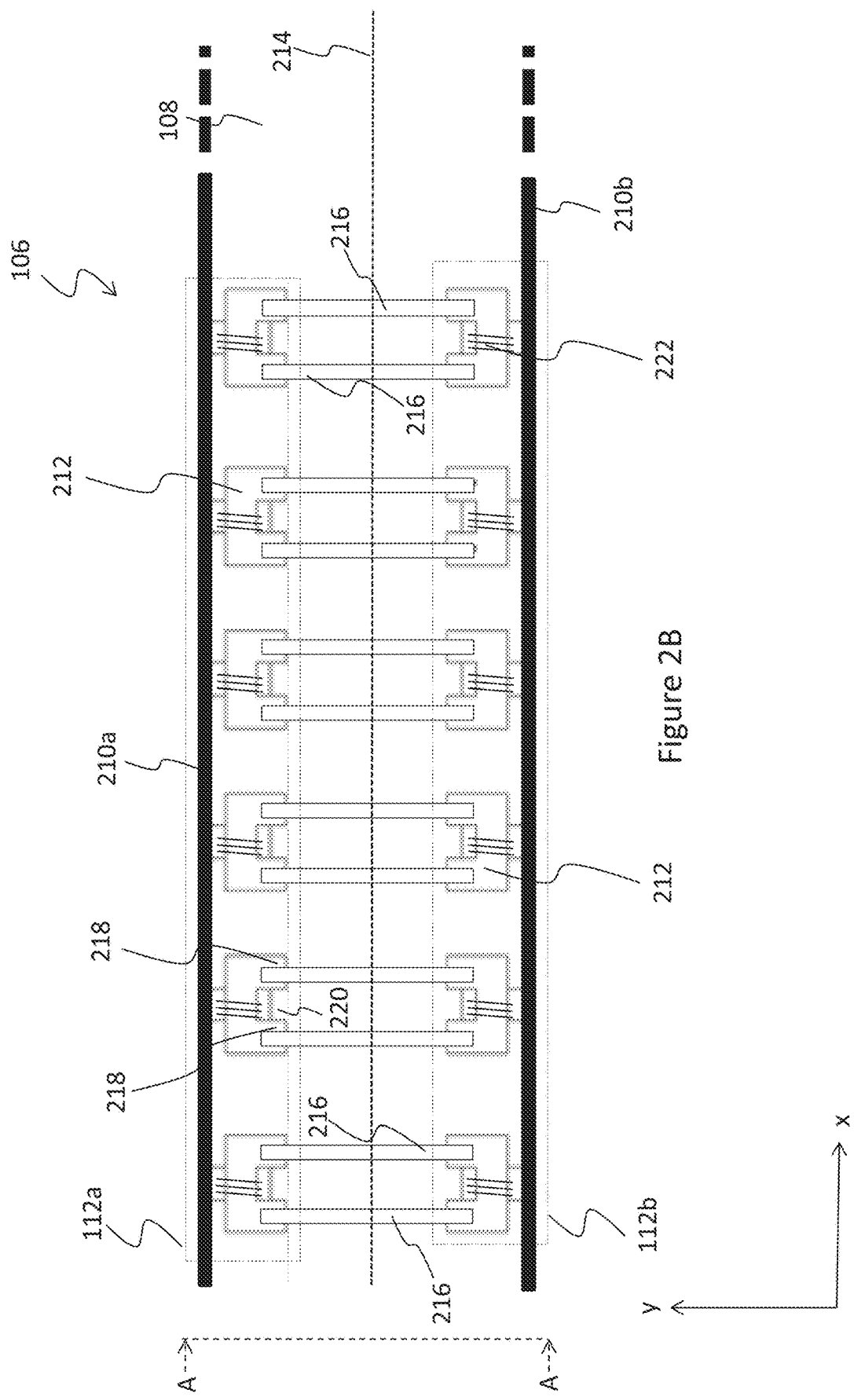
Figure 2C:
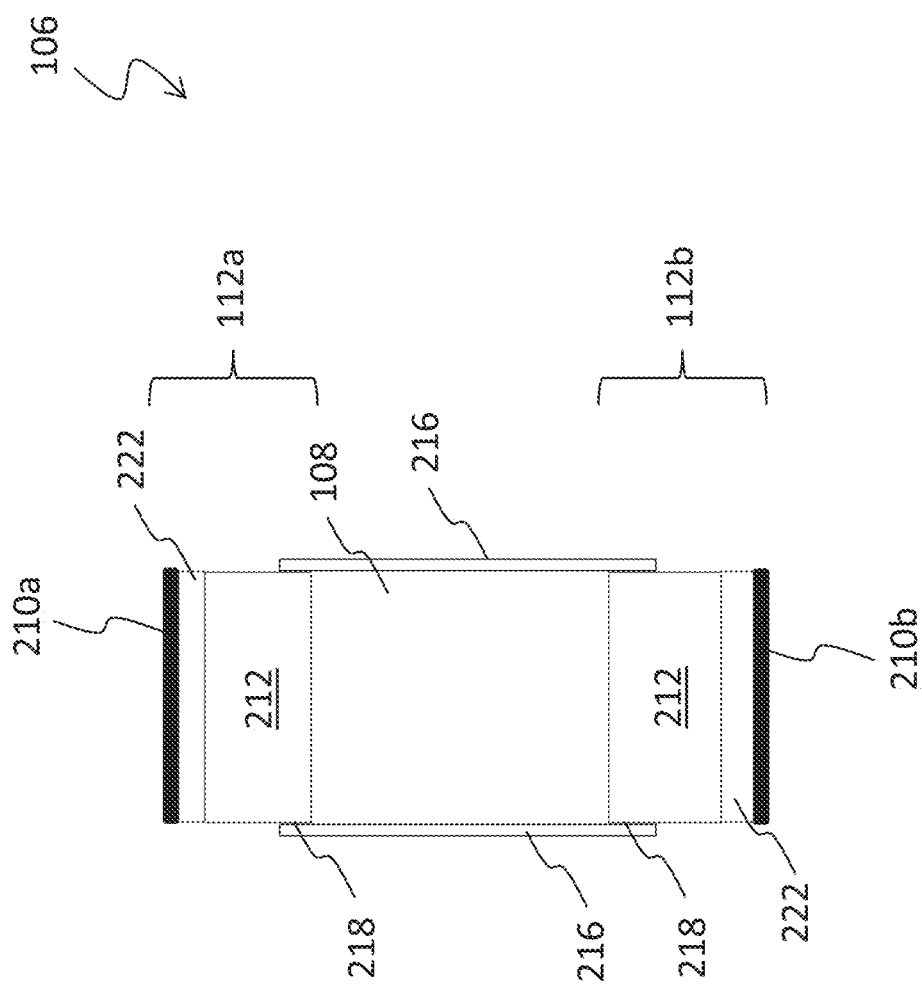
Figure 2D:
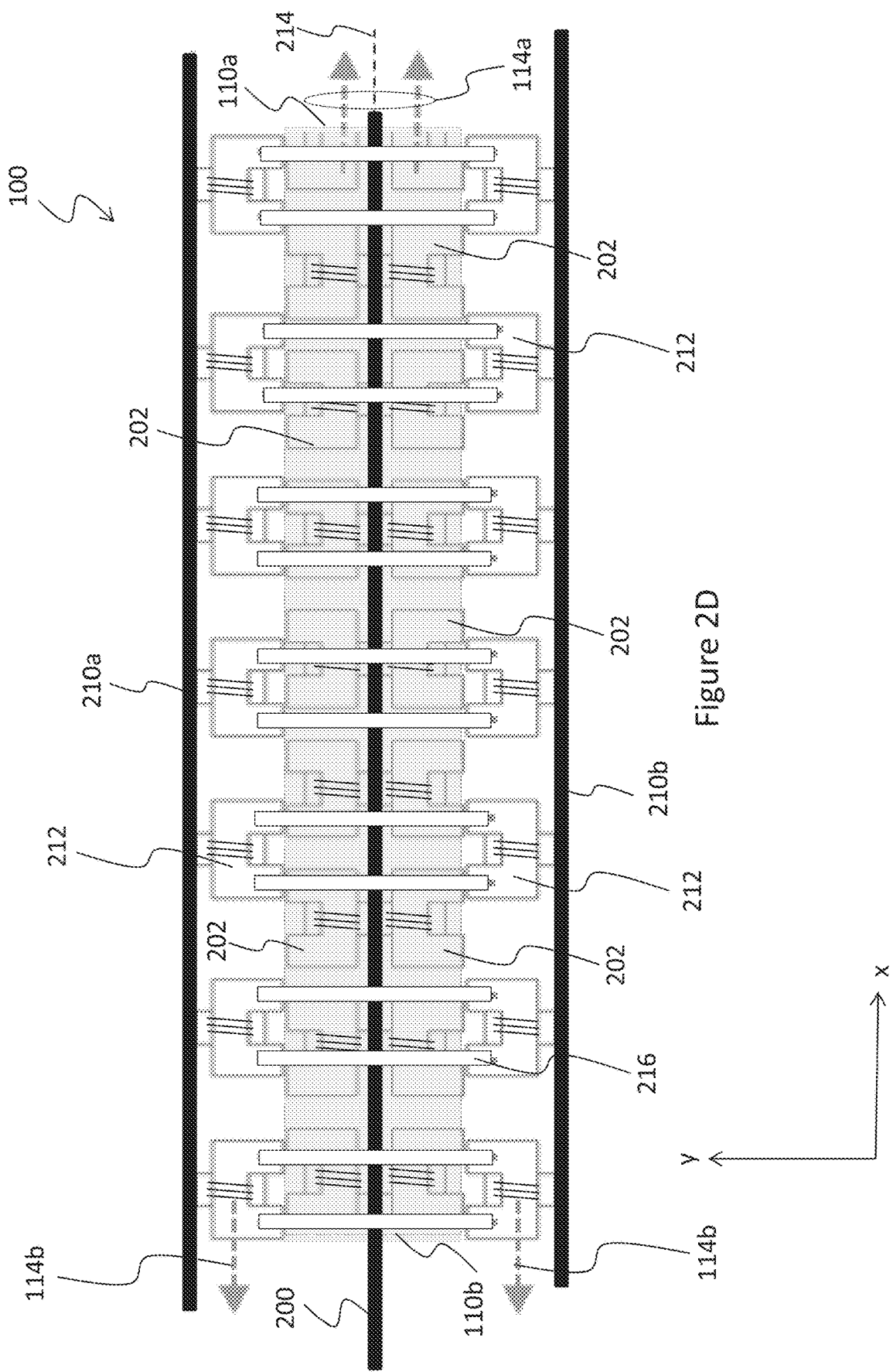

FIG. 2A shows, in greater detail, the structure of the internal fiber 104 and illustrates the first array of actuators 110a and the second array of actuators 110b of the internal fiber 104; FIGS. 2B and 2C shows, in greater detail, the structure of the external fiber 106 and its actuators; FIG. 2D shows the relative position and placement of the internal actuator array and the external actuator array of the artificial muscle fiber 100. In essence, FIGS. 2A to 2D show that the artificial muscle fiber 100 includes a plurality of strips of distributed actuators and electronics.

Referring first to FIG. 2A, the internal fiber 104 includes a flexible tape wire 200. The first array of actuators 110a and the second array of actuators 110b of the internal fiber 104 are electrically and mechanically coupled to the flexible tape wire 200, which includes electrical busses and driving electronics for the actuator arrays 110a, 110b. The distribution of the electrical busses and driving electronics in the flexible tape wire 200 is discussed in further detail below in reference to FIG. 12.

The first array of actuators 110a and the second array of actuators 110b are arranged on opposite sides of the flexible tape wire 200. As shown in FIG. 2A, the first array of actuators 110a and the second array of actuators 110b are arranged in a symmetrical manner about the flexible tape wire 200, and there are an equal number of actuators 202 in the first array of actuators 110a and in the second array of actuators 110b. Furthermore, for every actuator 202 in the first array of actuators 110a, there is a correspondingly positioned actuator 202 in the second array of actuators 110b, as illustrated in FIG. 2A. The example of FIG. 2A shows that each of the first array of actuators 110a and the second array of actuators 110b includes 8 actuators 202; however other embodiments may include a different number of actuators 202. It is also noted that in the description that follows, details regarding the first array of actuators 110a apply equally to the second array of actuators 110b.

Each actuator 202 of the first array of actuators 110a and the second array of actuators 110b is formed from a soft magnetic material (e.g. a ferromagnetic material or a magnetic material having relative magnetic permeability in the range of $10^2$ and $10^6$). Each actuator 202 is formed to include protrusions 206 (e.g. teeth) that are separated by a notch 204. In the example of FIG. 2A, as a result of this structure, each actuator 202 is a U-shaped actuator in which the protrusions 206 are directed away from a major surface of the flexible tape wire 200 to which the actuator 202 is attached. Each actuator 202 also includes respective windings 208 between the protrusions 206 and around the soft magnetic material at the notch 204 of the actuator 202. The windings 208 provide an electrical current that induces a magnetic field in the respective actuator 202 so that actuation of the artificial muscle fiber 100 can be achieved (as described in greater detail below in reference to FIGS. 4A to 4F).

As depicted in FIG. 2A, each of the actuator arrays 110a, 110b is divided into a first group 209 and a second group 211. Within the first group 209, adjacent (e.g. immediately adjacent) actuators 202 are separated by a dimension G. Similarly, within the second group 209, adjacent (e.g. immediately adjacent) actuators 202 are separated by the dimension G. However, the first group 209 of actuators 202 is separated from the second group 211 of actuators 202 by a dimension (G+Δ). In other words, an extra separation Δ is provided between adjacent (e.g. immediately adjacent) actuators 202 that are in different groups. As a result of the extra separation Δ, the pitch of the actuators 202 along the length of the first array of actuators 110a or along the length of the second array of actuators 110b is not constant. This feature is highlighted again below in reference to FIG. 3.

FIG. 2B shows a longitudinal view of a portion of the external fiber 106, in accordance with an embodiment. FIG. 2C shows a side view of the portion of the external fiber 106 along the line A-A of FIG. 2B. The external fiber 106 includes opposing flexible tape wires 210a, 210b that form opposite external walls of the external fiber 106 and define the opening 108 of the external fiber 106. The actuator arrays 112a, 112b of the external fiber 106 are formed within the opening 108 and are electrically and mechanically coupled to the flexible tape wires 210a, 210b, which include electrical busses and driving electronics for the actuator arrays 112a, 112b. The structure and distribution of the flexible tape wires 210a, 210b may be similar to that of flexible tape wire 200, and is discussed in greater detail below in reference to FIG. 12.

Each of the first array of actuators 112a and the second array of actuators 112b of the external fiber 106 includes a plurality of actuators 212 that protrude into the opening 108 defined by the opposing flexible tape wires 210a, 210b. As shown in FIG. 2B, the plurality of actuators 212 are arranged in a symmetrical manner about a central longitudinal axis 214 of the external fiber 106, and there are an equal number of actuators 212 in the first array of actuators 112a and in the second array of actuators 112b. An actuator 212 in the first array of actuators 112a may have a correspondingly positioned actuator 212 in the second array of actuators 112b, and such opposing actuators 212 are bonded to each other by connectors 216 (e.g. rigid paramagnetic connectors) so as to achieve structural stability and integrity of the external fiber 106. In the example of FIG. 2B, only the rigid paramagnetic connectors 216 of the leftmost opposing actuators 212 and the rightmost opposing actuators 212 are labelled for the sake of clarity. In general, the number of actuators 212 in each of the first array of actuators 112a and the second array of actuators 112b of the external fiber 106 is greater (e.g. at least two times greater) than the number of actuators in each of the first array of actuators 110a and the second array of actuators 110b of the internal fiber 104.

Similar to the actuators 202 of the internal fiber 104, each actuator 212 of the external fiber 106 is formed from a soft magnetic material (e.g. a ferromagnetic material or a magnetic material having relative magnetic permeability in the range of $10^2$ and $10^6$). Each actuator 212 is formed to include protrusions 218 (e.g. teeth) that are separated by a notch 220. In the example of FIG. 2B, the rigid paramagnetic connectors 216 are attached to protrusions 218 of opposing actuators 212. In the example of FIG. 2B, as a result of this structure, each actuator 212 is a U-shaped actuator in which the protrusions 218 are directed away from a major surface of the respective flexible tape wires 210a, 210b and into the opening 108. Each actuator 212 also includes respective windings 222 between the protrusions 218 and around the soft magnetic material at the notch 220 of the actuator 212 so that actuation of the artificial muscle fiber 100 can be achieved.

FIG. 2D shows a longitudinal view of a portion of the internal fiber 104 including the internal actuator array 110 inserted into the external fiber 106, leaving an air gap between actuators 202 of the internal fiber 104 and actuators 212 of the external fiber 106 such that no physical contact is made between the actuators 202 of the internal fiber 104 and the actuators 212 of the external fiber 106. The flexible tape wire 200 of the internal fiber 104 is aligned to the central longitudinal axis 214 of the external fiber 106. As a result, there is a spatial symmetry between the arrays 110a, 112b in the top half of the artificial muscle fiber 100 and the arrays 110b, 112b in the bottom half of the artificial muscle fiber 100. In essence, the internal fiber 104 can slide into the outer double strips of the external fiber 106, and reciprocal attraction along the longitudinal axis produces traction force 114a, 114b on the ends of the fibers 104, 106 that results in actuation of the artificial muscle fiber 100.

Figure 3A:
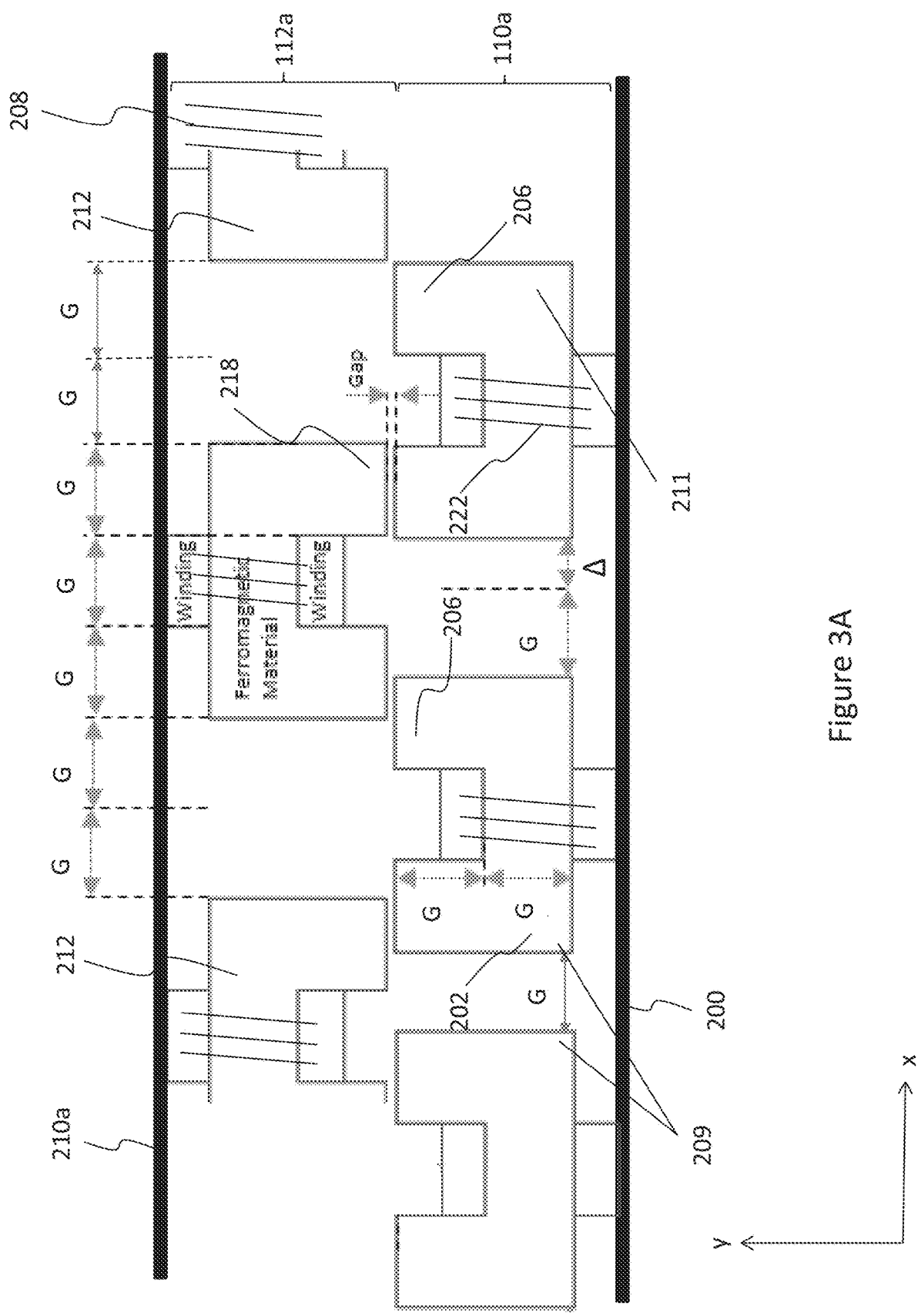
FIGS. 3A and 3B illustrate zoomed-in longitudinal views of some actuators of the artificial muscle fiber of FIGS. 2A to 2D, in accordance with various embodiments of the present disclosure.

FIG. 3A illustrates a zoomed-in longitudinal view of some of the actuators 202, 212 of the internal fiber 104 and the external fiber 106 in the embodiment of FIG. 2A. The purpose of FIG. 3A is to highlight pertinent dimensions of the actuators 202, 212 of the internal fiber 104 and the external fiber 106, and for the sake of simplicity and clarity, only some actuators 202 of the first array of actuators 110a of the internal fiber 104 and only some actuators 212 of the first array of actuators 112a of the external fiber 106 are shown. For the same reasons of simplicity and clarity, the rigid paramagnetic connectors 216 that bond opposing actuators of the external fiber 106 are omitted from FIG. 3A.

The non-zero gap that separates the protrusions 206 of the internal actuators 202 and the protrusions 218 of the external actuators 212 (indicated in FIG. 3A with the label "Gap") may be between 0 and G/2. As described above in reference to FIG. 2A, the actuator array 110a is divided into the first group 209 and the second group 211. As shown in FIG. 3A, within the first group 209, adjacent (e.g. immediately adjacent) actuators 202 are separated by the dimension G. However, as also shown in FIG. 3A, the first group 209 of actuators 202 is separated from the second group 211 of actuators 202 by a dimension (G+Δ).

The actuators 202 of the internal fiber 104 and the actuators 212 of the external fiber 106 have identical dimensions, which may be related to the dimension G. In particular, as shown in FIG. 3A, each protrusion 206, 218 of each of the actuators 202, 212 has a width along the longitudinal axis (e.g. y-axis in FIG. 3A) that is equal to the dimension G. Additionally, the notch 204, 220 of each of the actuators 202, 212 has a width along the longitudinal axis (e.g. y-axis in FIG. 3A) that is equal to the dimension G. Each protrusion 206, 218 extends from its respective notch 204, 220 (e.g. in the z-direction in FIG. 3A) by the dimension G. In some embodiments, the dimension G may be between 10 micrometers and 1000 micrometers.

While the dimensions of the actuators 202 of the internal fiber 104 and the actuators 212 of the external fiber 106 are identical, it is noted that the pitches are different. As an example, the pitch of the actuators 212 of the external fiber 106 is greater than the pitch of the actuators 202 of the internal fiber 104. As an illustration, in the example of FIG. 3A, the pitch of the actuators 212 of the external fiber 106 is 5 times the dimension G, while the pitch of the actuators 202 in each of the first group 209 and the second group 211 of the actuators of the internal fiber 104 is 4 times the dimension G. An extra separation Δ is added along the chains of actuators 202 of the internal fiber 104 after every pre-determined number of actuators 202 (e.g. four actuators 202). In some embodiments, the extra separation Δ may be equal to half the dimension G. It is noted that the stated pitches are exemplary and other pitches may be possible in other embodiments.

Figure 3B:
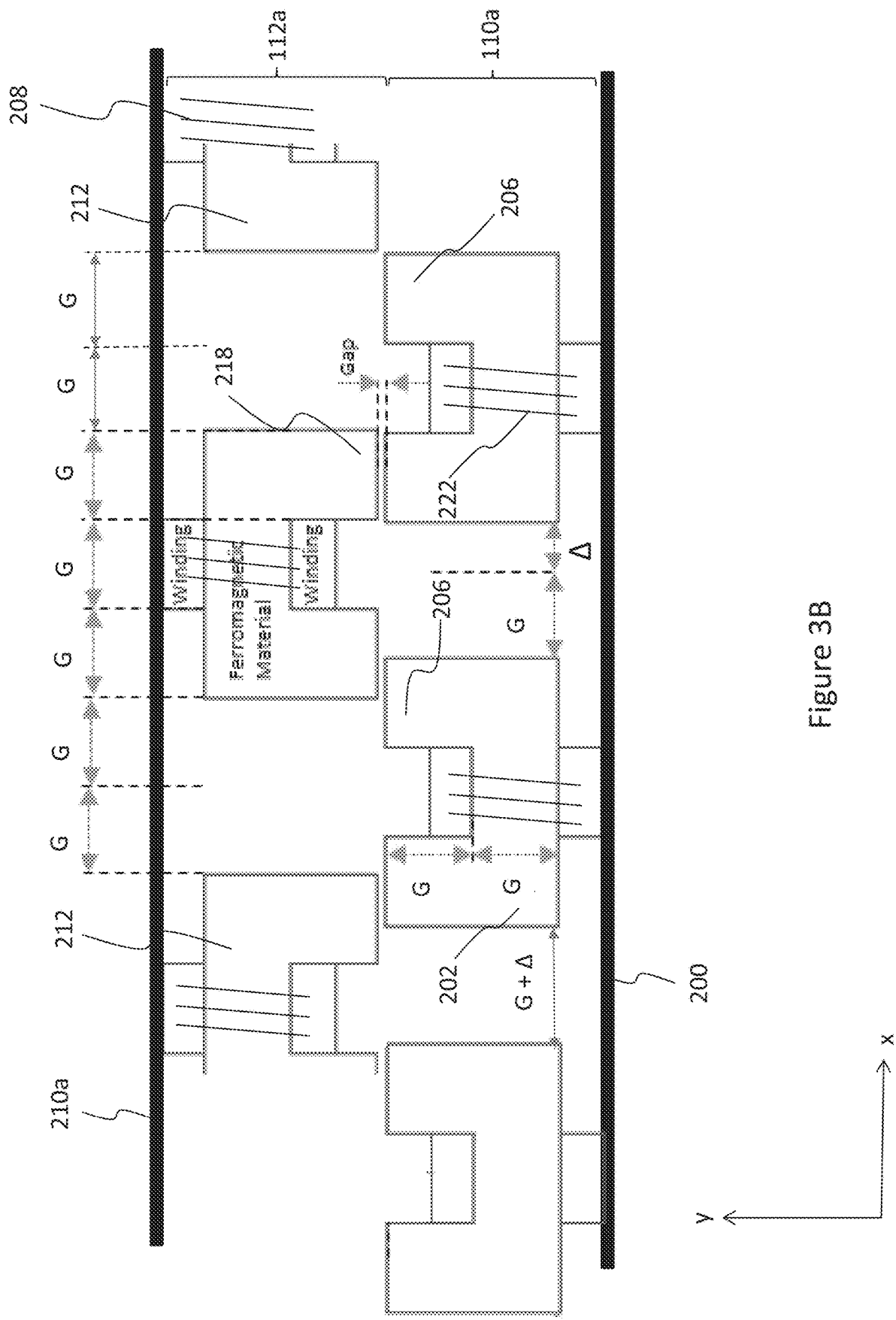

FIG. 3B shows a zoomed-in longitudinal view of some of the actuators 202, 212 of the internal fiber 104 and the external fiber 106 in another embodiment arrangement. The difference between the embodiments of FIGS. 3A and 3B is that in the arrangement of FIG. 3B, the actuator array 110a is not divided into the first group 209 and the second group 211, and instead, the pitch along the entire chain of actuators 202 of the internal fiber 104 is constant. The example of FIG. 3B shows that a pitch of 4.5 times the dimension G. However, as with the example of FIG. 3A, it is noted that the pitch of the actuators 212 of the external fiber 106 is greater than the pitch of the actuators 202 of the internal fiber 104.

FIGS. 4A to 4F illustrate the motion generated by a switching sequence applied to the actuators 202 and 212 of the internal fiber 104 and the external fiber 106 of FIG. 3B, in accordance with an embodiment of the present disclosure. Due to the symmetry of the artificial muscle fiber 100 along the central longitudinal axis 214 of the external fiber 106, only the switching sequence applied to the first array of actuators 110a of the internal fiber 104 and the first array of actuators 112a of the external fiber 106 are shown in FIGS. 4A to 4F. It is noted that an identical switching sequence is applied to the second array of actuators 110b of the internal fiber 104 and the second array of actuators 112b of the external fiber 106.

The switching sequence includes providing (e.g. simultaneously providing) an electrical current to one actuator 202 of the first array of actuators 110a of the internal fiber 104 and to one actuator 212 of the first array of actuators 112a of the external fiber 106 that are in a proper or predetermined relative position. In FIGS. 4A to 4F, the switched actuators are identified by the high, closed loop, magnetic field density. All the others actuators 202, 212 are turned off during this step (e.g. due to no current being provided to the other actuators 202, 212). The next step includes providing (e.g. simultaneously providing) an electrical current to an adjacent actuator 202 of the first array of actuators 110a of the internal fiber 104 and to an adjacent actuator 212 of the first array of actuators 112a of the external fiber 106 that are now in the proper relative position. As in the preceding step, all the others actuators 202, 212 are turned off during this subsequent step. This sequence of steps continues with the sequential provision of an electrical current to an actuator 202 of the internal fiber 104 and to an actuator 112a of the external fiber 106 that are in the proper or predetermined relative position until the desired motion is achieved. It is once again noted that an identical switching sequence is applied to the second array of actuators 110b of the internal fiber 104 and the second array of actuators 112b of the external fiber 106, thereby achieving identical motion therein.

In FIGS. 4A to 4F, each step produces a shift of G/2 in the x direction. The actuator chain 110a of the internal fiber 104 is kept still in FIGS. 4A to 4F, although an orthogonal force $F_Y$ is exerted on the actuator chain 110a of the internal fiber 104 as shown in FIGS. 4A to 4F. The internal fiber 104 is kept still in the longitudinal direction (e.g. x-axis) for the purposes of the simulation shown in FIGS. 4A to 4F. The actuator chain 112a of the exterior fiber 106 moves from right to left (as shown by the arrow and force $F_X$ exerted on the actuator chain 112a of the exterior fiber 106). The two opposing triangles markers 400, 402 also shows the motion of the actuator chain 112a of the exterior fiber 106 through the increase of the relative separation of the two opposing triangles markers 400, 402.

A study into the forces $F_X$, $F_Y$ generated by the switching sequence was done for an actuator array that is 1 millimeter deep (e.g., dimension Lz in FIG. 1B is 1 mm), with G=200 micrometers, and a gap of 20 micrometers (i.e., 20 micrometers separates the protrusions 206 of the internal actuators 202 and the protrusions 218 of the external actuators 212). The study assumed that the windings 208, 222 of the actuators 202, 212 included 100 copper wires driven by a current of 0.5 Amperes and that each actuator 202, 212 was formed from either a silicon-steel soft magnetic material, a cobalt-iron alloy, pure iron, or other similar ferromagnetic materials. The forces $F_X$, $F_Y$ on a selected domain were computed by Finite Element Method Magnetics (FEMM) software applying a Maxwell stress tensor method. Additionally, the study applied the sequence of steps described above in reference to FIGS. 4A to 4F until a desired linear motion of 600 micrometers was achieved (i.e., the switching sequence was applied until the relative separation of the two opposing triangles markers 400, 402 was 600 micrometers).

Figure 5:
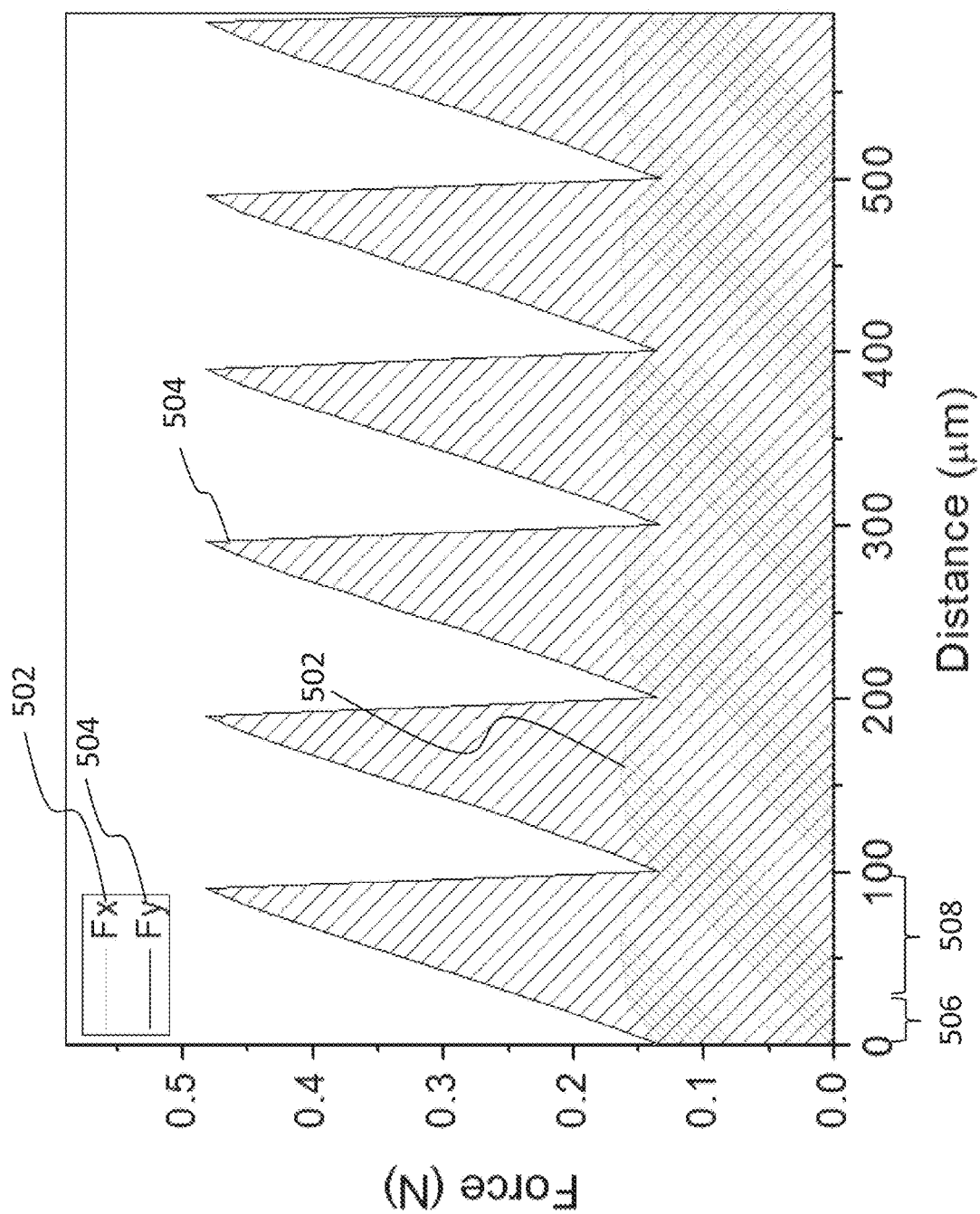
FIG. 5 shows results of a study into forces generated by the switching sequence described in FIGS. 4A to 4F, in accordance with an embodiment of the present disclosure.

FIG. 5 shows results of the study into the forces $F_X$, $F_Y$ generated by the switching sequence. FIG. 5 illustrates a G/2 (i.e., 100 micrometer) switch period, which comports with the illustration in FIGS. 4A to 4F where each step produces a shift of G/2. FIG. 5 also shows that the useful linear force $F_X$ produces a smooth movement between an initial position and a final position of each step (e.g. as exemplified by the substantial constant $F_X$ at each step of the switching sequence). FIG. 5 also shows that the orthogonal attractive force $F_Y$ increases linearly during each step, with the magnitude of $F_Y$ being comparable with the useful linear force $F_X$ at an initial duration 506 of each step, but surpassing $F_X$ during a subsequent duration 508 of each step. The average useful linear force $F_X$ along the whole path is about 0.15 N, while the $F_X/F_Y$ ratio is about 0.5.

As mentioned above, the orthogonal force $F_Y$ is present that causes an attraction between the switched actuator 202 of the internal fiber 104 and the switched actuator 212 of the external fiber 106. In a typical structure, the orthogonal force $F_Y$ pushes on bearings in order to maintain the gap distance. However, in the designed proposed in this disclosure, no bearings or rotating parts are desired and the orthogonal force $F_Y$ is reduced or substantially eliminated through symmetry between the first array of actuators 110a and the second array of actuators 110b of the internal fiber 104, as shown in FIG. 2A. Furthermore, a pliers effect or motion is avoided in the external fiber 106 since opposing actuators 212 of the external fiber 106 are bonded to each other by connectors 216 (e.g. rigid paramagnetic connectors), as shown in FIG. 2B. The inner chain of the fiber will be however subjected to an orthogonal force resulting from the composition of the upper and lower external chain generated forces.

Figure 6:
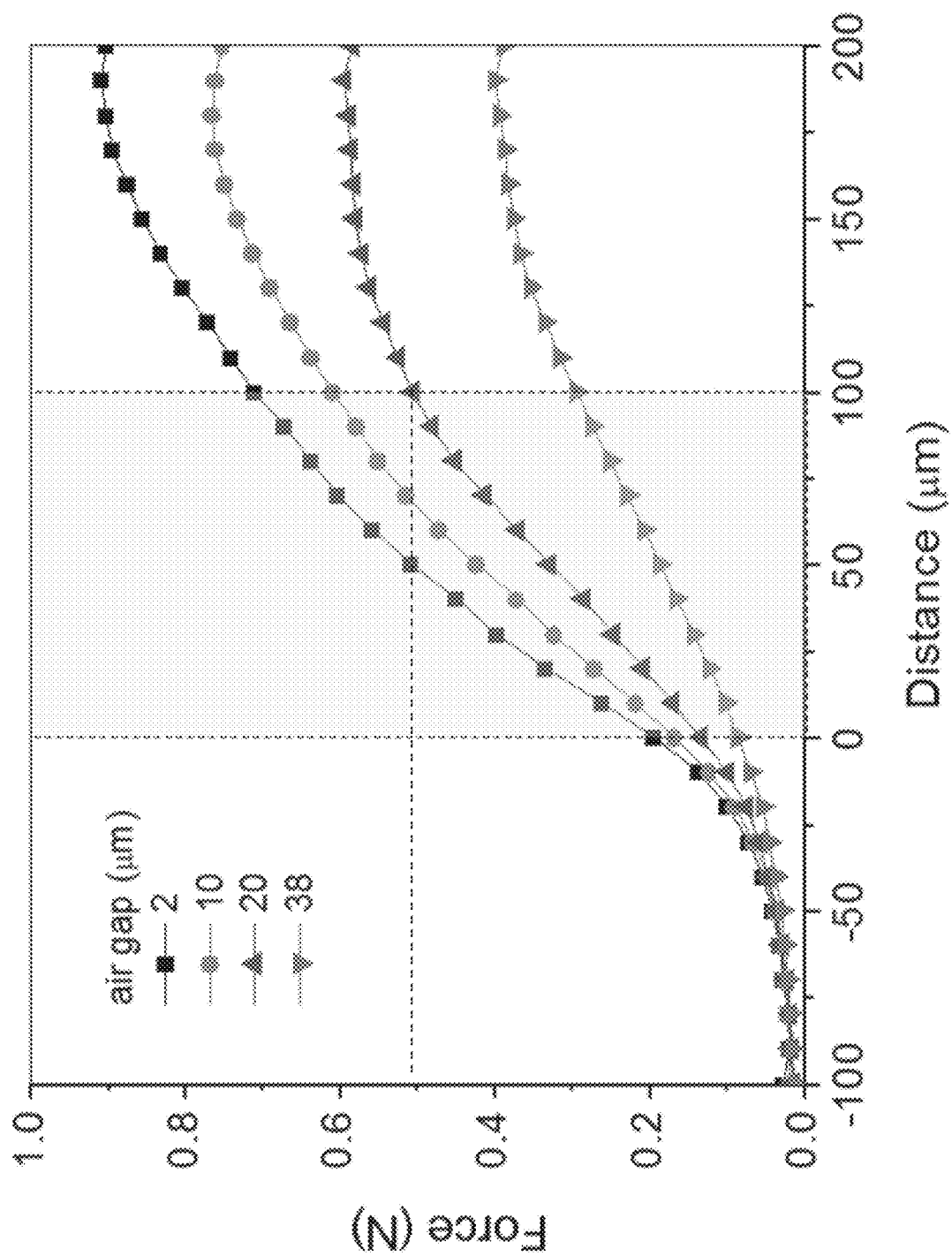
FIG. 6 shows results of a study into magnitude of an orthogonal force and its variation as a function of a non-zero gap that separates an internal fiber and an external fiber of an artificial muscle fiber, in accordance with an embodiment of the present disclosure.

A study was also conducted into the magnitude of the orthogonal force $F_Y$ and its variation as a function of the non-zero gap that separates the protrusions 206 of the internal actuators 202 and the protrusions 218 of the external actuators 212, and FIG. 6 shows the result of such a study. In FIG. 6, the magnitude of the orthogonal force $F_Y$ is indicated, considering different gap distances. As shown in FIG. 6, for a separation gap of about 20 micrometers, the magnitude of the orthogonal force $F_Y$ increases from the initial phase of the actuation step until a maximum value of about 0.5 N.

In addition to the orthogonal force $F_Y$ that can interfere with the useful linear force $F_X$, frictional forces may be exerted depending on the surface composition of the actuators 202, 212. Frictional forces can be estimated from the product of the orthogonal force $F_Y$ and the coefficient of friction of the material formed at the surface of the actuators 202, 212. In general, in order to minimize the frictional forces, a thin anti-friction coating or a liquid lubricant phase can be applied to the actuators 202, 212. For example, by finishing the surfaces of the actuators 202, 212 with Teflon (having a coefficient of friction of 0.04), even in the last phase of the actuation step, the resultant frictional force is in the range of about 1% to 6% with respect to the linear force $F_X$. Table I below shows static and dynamic coefficients of friction for various surfaces. In general, a vapor deposition process may be used for producing ultra-thin polytetrafluoroethylene (PTFE) coatings on a substrate, producing coatings with precisely controlled thicknesses at low temperature with excellent adhesion. Such coatings are conformal and able to penetrate into and around complex structures. The PTFE coating protects coated substrates from moisture, chemicals, and electric charge.

TABLE I

Static and Dynamic Coefficients of Friction for Various Surfaces

| Surfaces | Static Coefficient of Friction | Dynamic Coefficient of Friction |
| --- | --- | --- |
| Steel -Steel (Unlubricated) | 0.74 | 0.42 |
| Steel - Steel (Lubricated) | 0.11 | 0.05 |
| Steel - Teflon | 0.04 | 0.04 |
| Teflon - Teflon | 0.04 | 0.04 |

Natural human muscles are able to withstand a strain of more than 40%, a sustainable stress of 0.1 MPa, and a maximum stress of about 0.35 MPa. Based on the simulated chain of FIGS. 4A to 4F with an average useful linear force $F_X$ of 0.15 MPa, at least three fiber sections (each made of eight external actuators 212) have to work at the same time, giving about 0.38 MPa as the maximum pressure of the artificial muscle fiber 100.

Such results can be applied to compare the stress-strength behavior of the artificial muscle fiber 100 with that of natural human muscles. Considering the artificial muscle fiber 100 where the external fiber 106 has a length (e.g. in the x-direction) of about 100 times the pitch of the actuators 212, thus yielding an external fiber length of about 10 centimeters. In such a case, the internal fiber 104 may have the same length and the artificial muscle fiber 100 has a total length of 20 centimeters when fully extended.

Figure 7:
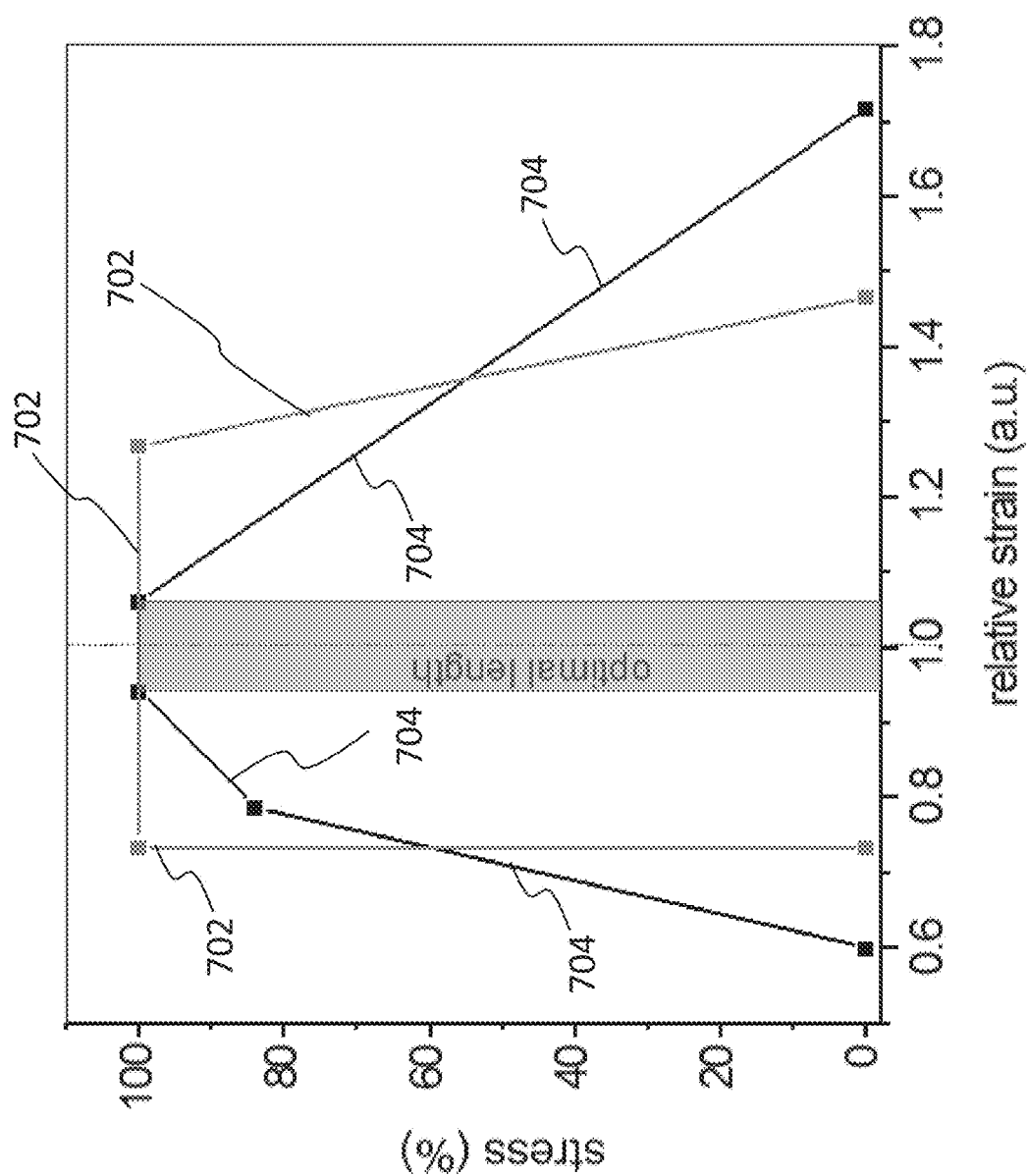
FIG. 7 shows stress/strength behavior of an artificial muscle fiber, in accordance with an embodiment of the present disclosure.

Assuming a simplified model in which the generated force is proportional to the overlap, the stress/strength behavior of the artificial muscle fiber 100 can be seen in FIG. 7. Starting from the full extended configuration (zero force where the internal fiber 104 is outside and not yet inserted into the opening 108 of the external fiber 106), the stress (depicted by curve 702) rise steeply as the actuator arrays 110a, 110b of the internal fiber 104 are inserted into the external fiber 106 until a maximum stress in reached when the actuator arrays 110a, 110b of the internal fiber 104 and the actuator arrays 112a, 112b of the external fiber 106 fully overlap. Thereafter, a constant plateau is reached, until the internal fiber 104 is fully inserted into the opening 108 of the external fiber 106. The behavior of curve 702 can be compared to the active stress-strength of vertebrate animals muscles, reproduced as curve 704 in FIG. 7, where relative strength are related to the center of the optimal length region indicated in FIG. 7. In comparison to curve 704, the curve 702 indicates that the artificial muscle fiber 100 shows a wider range at full stress with a strain of about 75%. It is noted that natural human muscle, at a certain elongation (variable with muscle type), may also develop passive tension. However, reproduction of a passive tension mechanism in the artificial muscle fiber 100 is beyond the scope of the present disclosure.

Figure 8:
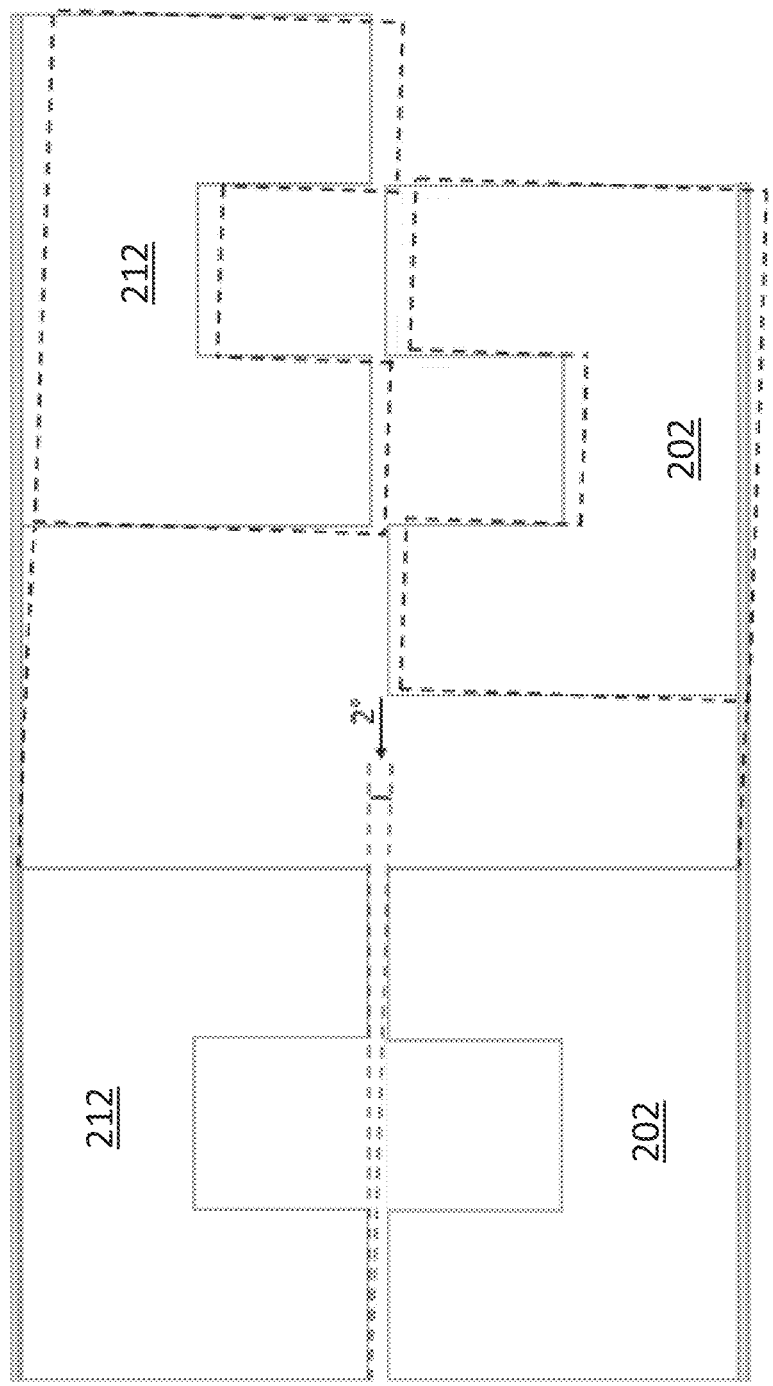
FIG. 8 shows torsion between two successive actuators of an internal fiber of an artificial muscle fiber and two successive actuators of an external fiber of the artificial muscle fiber, in accordance with an embodiment of the present disclosure.

FIG. 8 shows two successive actuators 202 of the internal fiber 104 and two successive actuators 212 of the external fiber 106. Solid lines in FIG. 8 indicate a straight configuration of the actuators 202, 212, while dashed lines indicate a slightly bent configuration of the actuators 202, 212. FIG. 8 is shown to highlight torsion that may be present in the actuators 202 of the internal fiber 104 and the actuators 212 of the external fiber 106. The maximum angle that an innermost actuator 202 of the internal fiber 104 can rotate with respect to an outermost actuator 202 of the internal fiber 104 (and similarly that an innermost actuator 212 of the external fiber 106 can rotate with respect to an outermost actuator 212 of the external fiber 106) is related to the non-zero gap that separates the protrusions 206 of the internal actuators 202 and the protrusions 218 of the external actuators 212. The maximum rotation angle is also related to the longitudinal extent of the actuators 202, 212 (e.g. 3 times the dimension G in the examples provided herein). In the example of FIG. 8, a successive actuator 202, 212 is rotated by about 20 compared to its immediately preceding actuator 202, 212. However, considering that the internal fiber 104 or the external fiber 106 can have a total of 100 actuators in each of its arrays, the maximum rotation angle can be greater than or equal to 90°, even if there is a rotation of about 1° between immediately adjacent actuators 202, 212.

With regards to flexibility, a consequence of the structure of the artificial muscle fiber 100 is that, assuming constant geometric aspect ratios for the dimension G, the height, and gap of the actuators 202, 212, flexibility of the artificial muscle fiber 100 can be increased by scaling down the size of the actuators 202, 212. That is, for a given length of the artificial muscle fiber 100, flexibility of the artificial muscle fiber 100 can be increased by reducing the size of the actuators 202, 212, while increasing the number thereof in each array of the internal fiber 104 and the external fiber 106. However, as discussed below, there is a limitation to down-scaling.

Figure 9:
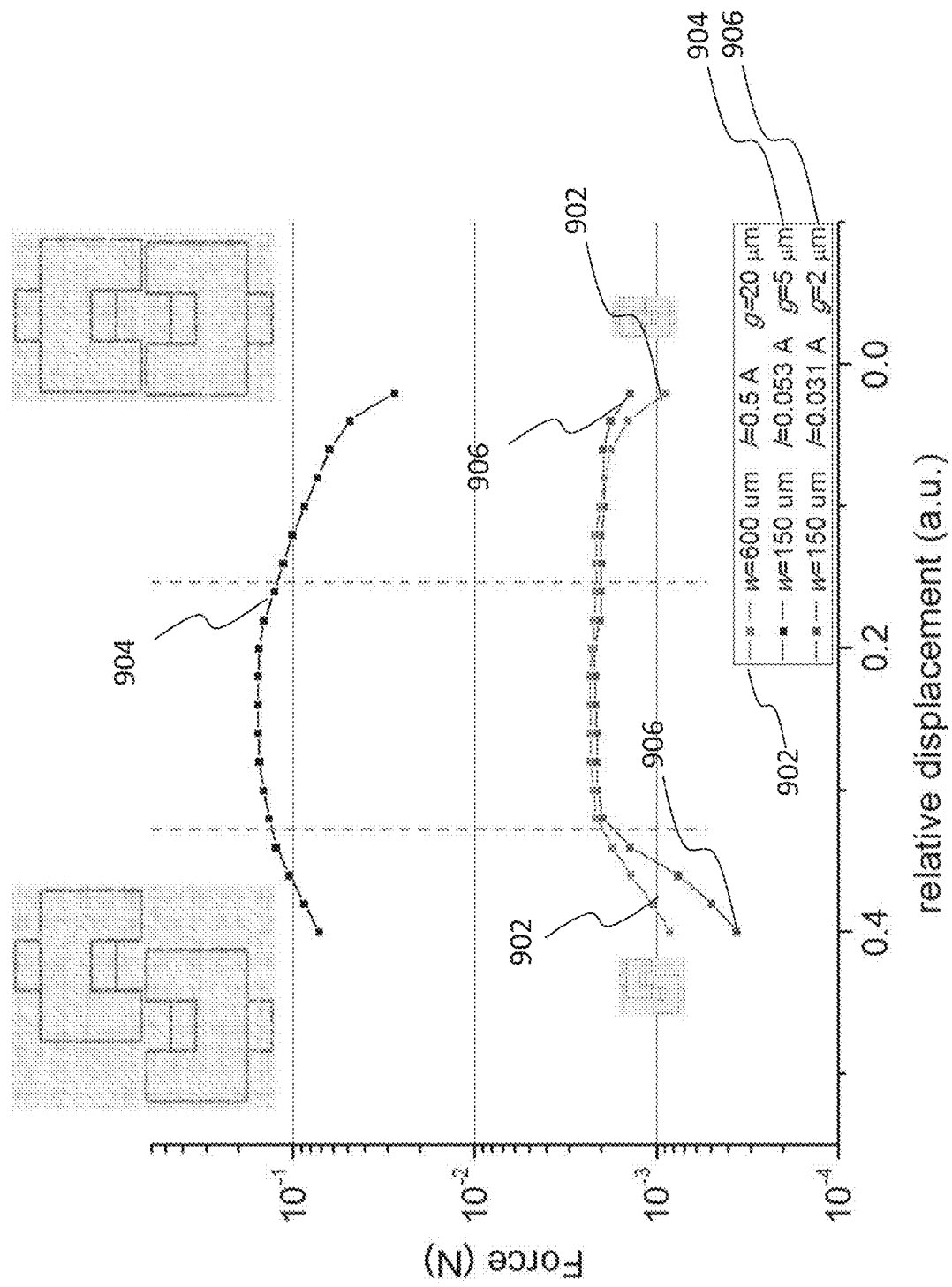
FIG. 9 shows simulation results of the force generated by a single pair of actuators scaled down by a factor 4, in accordance with an embodiment of the present disclosure.

An artificial muscle fiber 100 with a cross-sectional area (e.g. taken in the Y-Z plane) of 1 mm$^2$ or more may be suited for the construction of many kinds of robotic arms. However, if smaller devices are needed, a certain degree of down-scaling is still possible without excessive performances degradation. For example, scaling all dimensions of the artificial muscle fiber 100 by a factor k may require an increase in the number of actuators in a unit volume by a factor k$^3$. Therefore, in order to get a constant force per unit fiber volume, in the down-scaled artificial muscle fiber, a maximum force reduction of a factor k$^3$ is allowed for each actuator 202, 212. FIG. 9 shows simulation results for a single pair of actuators 202 or 212 scaled down by a factor 4. The curve 902 shows force-position curves for an actuator having a longitudinal extent of 600 micrometers (e.g. 3 times the dimension G in the examples provided herein), with 100 wires in its respective winding, and a 0.5 A current flowing there-through. The curve 904 shows force-position curves for a down-scaled actuator having a longitudinal extent of 150 micrometers with 100 wires in its respective winding, and a current chosen (e.g. 0.053 A) to give a simulated force that is down-scaled by a factor of 4$^3$. The curves 902, 904 indicate that the scaled-down artificial muscle fiber 100 can be still functional; however the increased current density causes a reduction of its efficiency by a factor three. A different approach to get to the k$^3$ scaled force could be to over scale the gap. In the graph, a curve 906 giving the same force and power density as the 600 micrometer-wide actuator can be achieved by reducing the gap distance to 2 micrometers and reducing the current to 0.03 A.

The results in FIG. 9 indicate that, to apply the proposed fibers to relatively complex robotics elements (e.g., legs, arms and even tiny fingers), the typical scaling law of k$^4$ is not an impediment. Further, a certain higher power consumption could be accepted since it affects only the smaller parts of a certain designed robots with a minor impact on the overall power consumption.

With regards to compliance and motion, as presented in the description above, the artificial muscle fiber 100 is free from blocking points, which means that it is intrinsically compliant, without need of any dumping system. Of course this also means that, depending on the application, minimal power consumption should be required in order to keep the artificial muscle fiber 100 slightly stressed. The description presented above also shows the presence of a modest, and yet not zero, ripples in the useful linear force $F_X$. A consistent ripple reduction behavior can be expected by applying a tuned current versus position waveform and by the averaged force due to a bundle of more fibers having slight different relative positions.

This disclosure also presents a high throughput method of manufacturing each actuator of the artificial muscle fiber 100, even in cases where high integration level is needed. In the case of artificial muscle fibers 100 having a cross-sectional area of 1 mm$^2$ or more, an approach based on discrete assembly technology may be possible. However, when small micrometer-scale actuators 202, 212 are needed for the artificial muscle fiber 100, integrated circuit (IC) manufacturing processes (used for example in MEMS device fabrication) can be used to build highly integrated actuators 202, 212 and fibers 100.

Figure 10G:
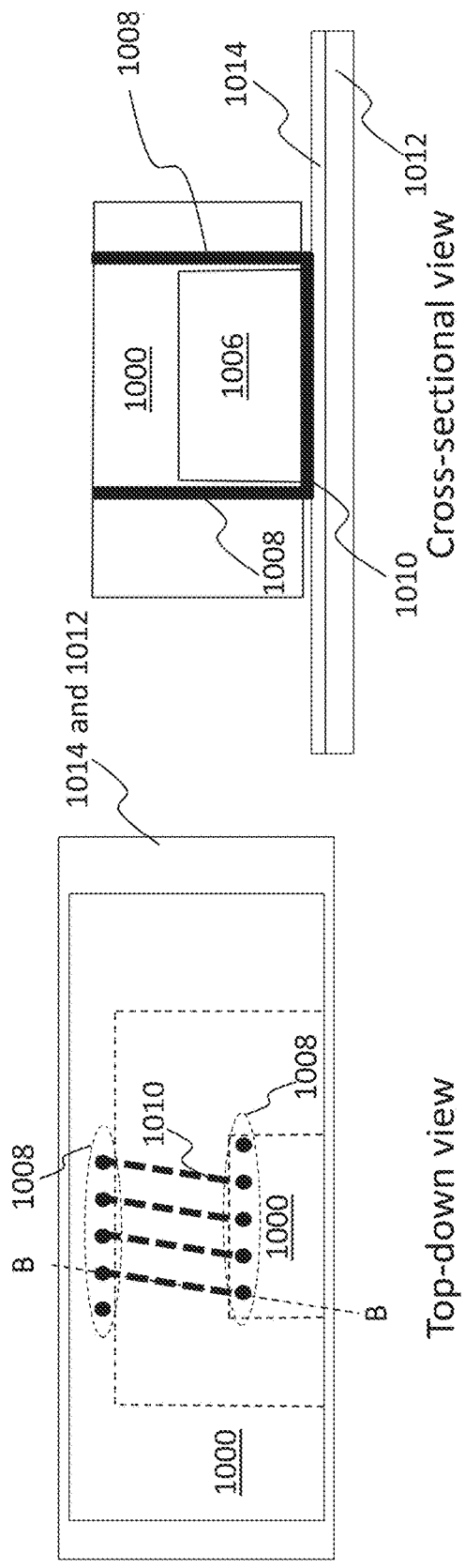

FIGS. 10A to 10J illustrate a process of manufacturing an actuator of the artificial muscle fiber 100, in accordance with an embodiment. FIG. 10A shows a top-down view and a cross-sectional view of a semiconductor substrate 1000 that acts as a sacrificial material in which the actuator is manufactured. The cross-sectional view is taken along the line B-B indicated in FIG. 10A. The semiconductor substrate 1000 may be a silicon wafer.

FIG. 10B illustrates a mask layer 1002 that is formed and patterned over the semiconductor substrate 1000. The mask layer 1002 is deposited on the semiconductor substrate 1000 (e.g. using vapor deposition processes) and patterned using suitable photolithography techniques. In some embodiments, where the mask layer 1002 includes a photoresist material, the photoresist material is irradiated (exposed) and developed to remove portions of the photoresist material in order to expose portions of the semiconductor substrate 1000, as shown in FIG. 10B.

FIG. 10C shows a trench 1004 formed in the semiconductor substrate 1000 by an etching process. A top-down view of the trench 1004 has the U-shape that is needed for the actuators 202, 212 of the artificial muscle fiber 100. The mask layer 1002 functions as an etch mask during the etching process, which may include isotropic wet etching processes, anisotropic dry etching processes, or combinations thereof.

FIG. 10D shows that the trench 1004 may be filled with a soft magnetic material 1006 through an electro chemical deposition (ECD) process, followed by a planarization such as a chemical mechanical polish (CMP) to ensure that the top-most surfaces of the soft magnetic material 1006 and the semiconductor substrate 1000 are substantially flush. The mask layer 1002 may also be removed so as to expose portions of the semiconductor substrate 1000 in which windings are formed in a subsequent step.

FIG. 10E shows the formation of high aspect ratio, high density through vias 1008 that are filled with a conductive material (e.g. copper). This process may be performed by copper through silicon vias (TSV) technology known in the art. The vias 1008 are formed in the semiconductor substrate 1000 next to the vertical walls of the soft magnetic material 106. As shown in FIG. 10E, the vias 1008 are also located between the protrusions of the actuator.

Through a sequence of conventional dielectric depositions and lithography steps, first on the frontside of the semiconductor substrate 1000 and then on the backside of the semiconductor substrate 1000, the vias can be connected to form a squared winding (e.g. shown in FIG. 11) around the soft magnetic material 1006. This proposed sequence is shown in FIGS. 10F to 10J.

In FIG. 10F, vias 1008 on opposite sides of the vertical walls of the soft magnetic material 1006 are coupled to each other by interconnecting wires 1010 that are formed from the same conductive material (e.g. copper) that fills the vias 1008. This may be accomplished by a one or more insulation and lithography processes performed on the exposed surface of the semiconductor substrate 1000 that deposit conductive material in the manner shown in FIG. 10F to form the interconnecting wires 1010.

FIG. 10G shows that the frontside of the semiconductor substrate 1000 having the interconnecting wires 1010 is attached to a carrier substrate 1012 via a die attach film (DAF) 1014 that acts to adhere the semiconductor substrate 1000 to the carrier substrate 1012. As a result of the step shown in FIG. 10G, the backside of the semiconductor substrate 1000 is exposed and may be subjected to further processing in order to form a squared winding around the soft magnetic material 1006.

Figure 10H:
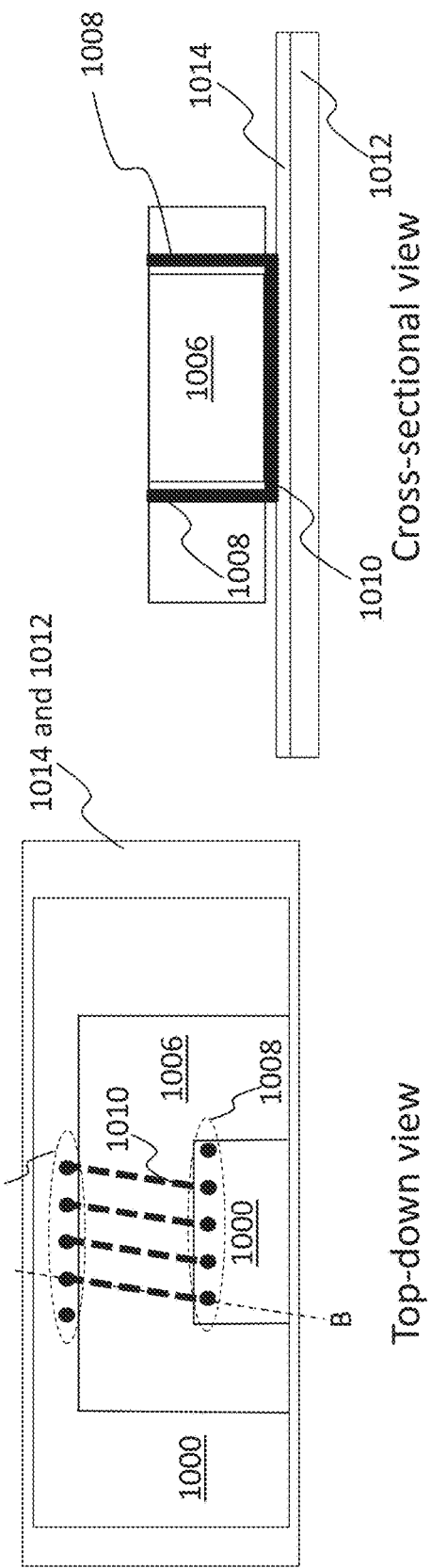
Figure 11:
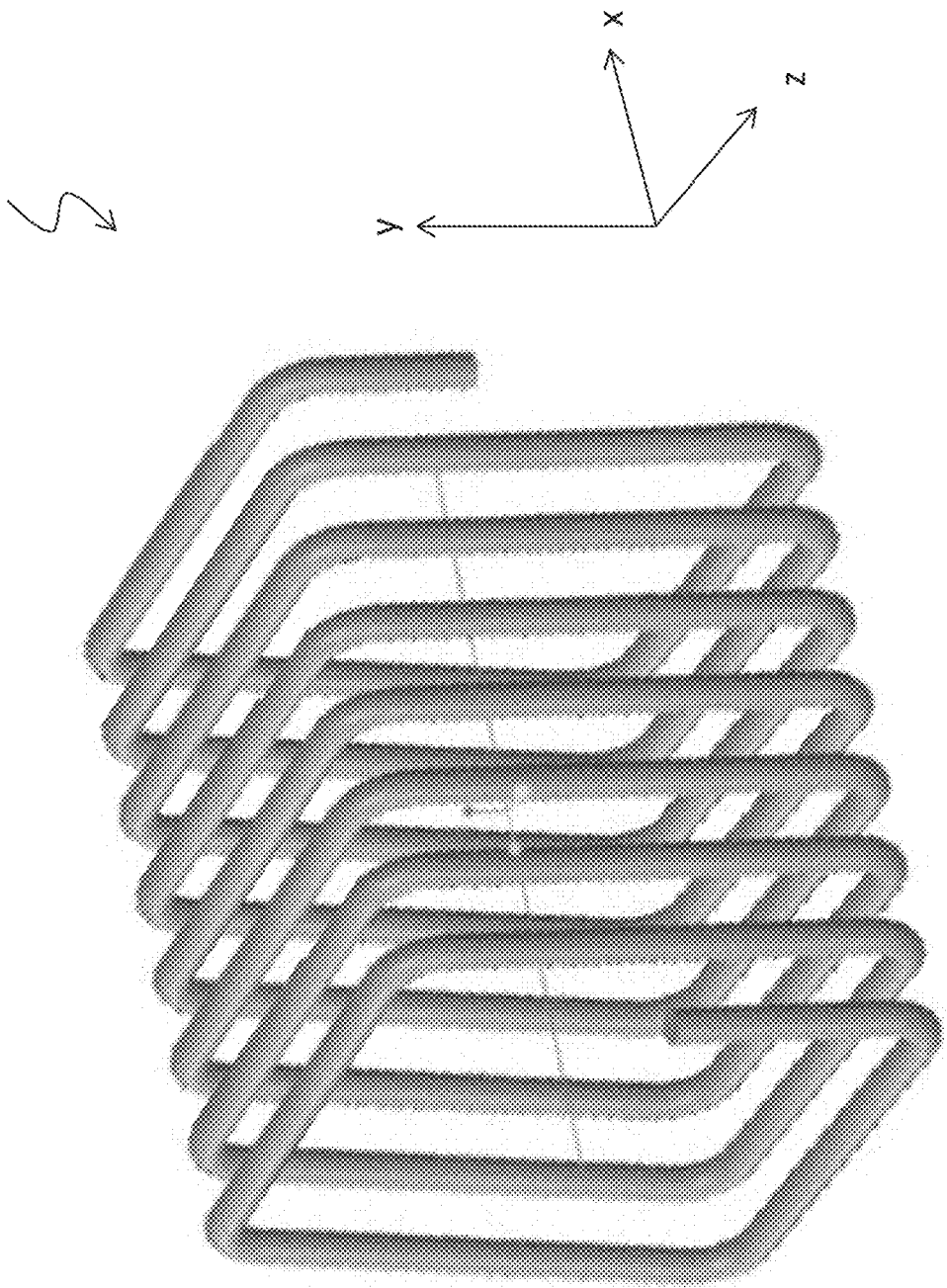
FIG. 11 illustrates a squared winding that may be formed around a portion of an actuator of an artificial muscle fiber, in accordance with an embodiment of the present disclosure.

In particular, in FIG. 10H, the backside of the semiconductor substrate 1000 and the vias 1008 are planarized to expose the backside of the soft magnetic material 1006 so that the backside of the semiconductor substrate 1000, the backside of the soft magnetic material 1006 and the exposed ends of the vias 1008 are substantially flush. Subsequently, as shown in FIG. 10I, further interconnecting wires 1016 are formed (e.g. using the same process used in conjunction with FIG. 10F) to complete the squared winding around the soft magnetic material 1006. FIG. 10J shows that an etching process (e.g. selective wet chemical etching) is applied to remove the remaining portions of the sacrificial semiconductor substrate 1000, thereby forming the free-standing actuator.

The proposed method results in a single actuator, and consequently, an IC assembly technology may be needed for the successive steps of wire bonding the manufactured actuators onto proper connecting strips. Materials for such a strip can be chosen for process convenience and electronics integration. Many materials may be able to sustain the developed force even as thin film. For example, for the described artificial muscle fiber 1000 with a cross-sectional area of 1 mm$^2$ (developing 0.38 MPa), a strip that is 1 mm wide and having a thickness of 20 micrometers has to sustain an elastic strength of 8 MPa. Metal strips and also various polymers (e.g. aluminum, polyimide, etc.) have elastic strength well above such value.

Figure 12:
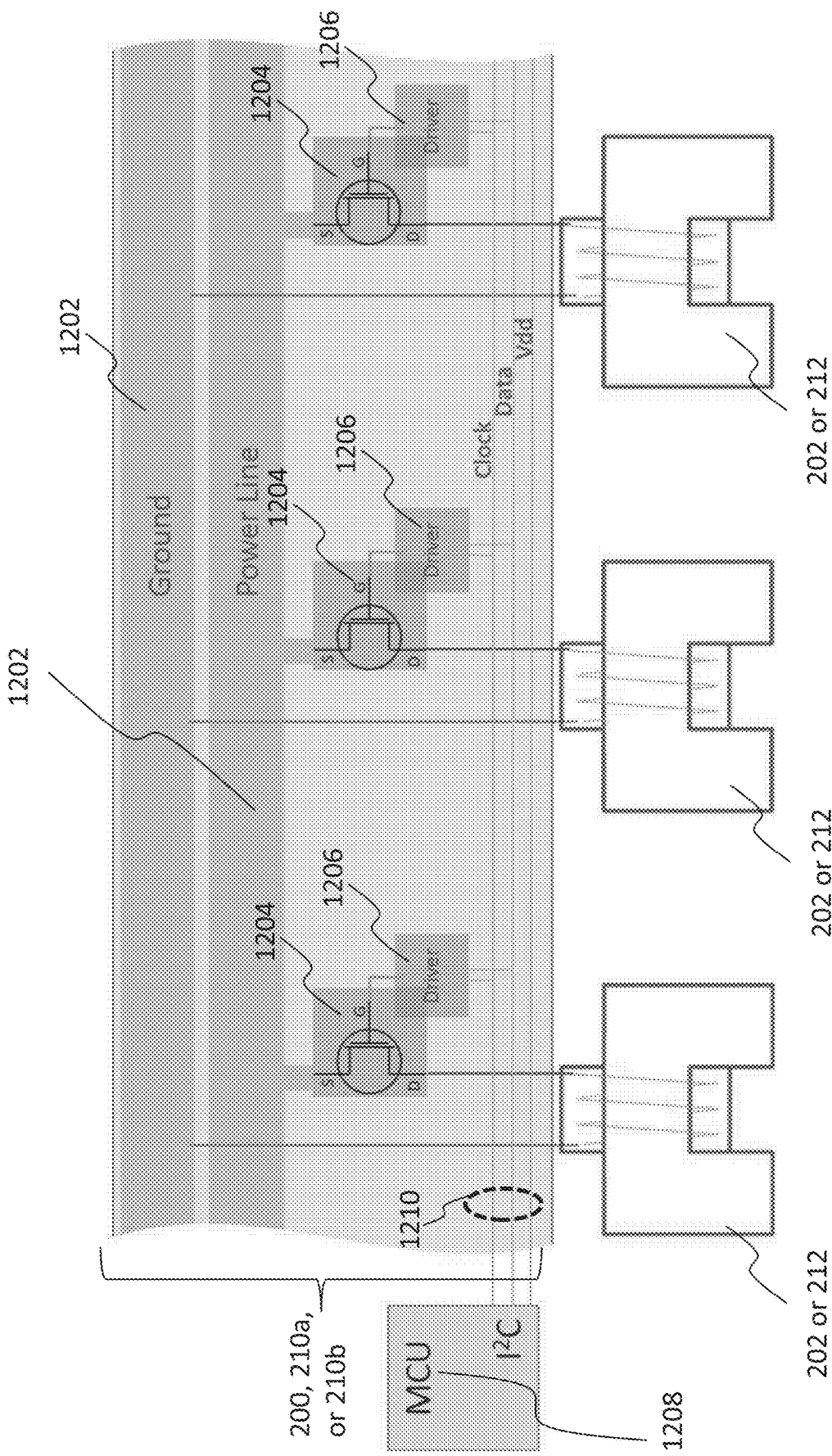
FIG. 12 shows a sketch of a circuit distribution along a flexible tape wire, in accordance with an embodiment of the present disclosure.

The stepped motion sequence, as described above in reference to FIGS. 4A to 4F, requires the actuators 202, 212 of the various array segments 110a, 110b, 112a, 112b to be independently powered and driven through application specific integrated circuits (ASICs) and/or microcontrollers. FIG. 12 shows a sketch of a possible circuit distribution along the flexible tape wire 200, 210a, or 210b. Due to the flexibility required of the artificial muscle fiber 100, power devices are placed over the rigid actuators, whole analog and digital busses are placed in the space between two adjacent actuators.

As shown in FIG. 12, the flexible tape wire includes a plurality (e.g. two) power bus lines 1202 (e.g. including a power line and a reference potential line, such as a ground line), a plurality of distributed power transistors 1204 (e.g. MOSFETS), and respective drivers 1206 associated with the power transistors 1204. The power and ground lines 1202 connect to the distributed power MOS devices 1204 and actuator windings. A microcontroller 1208 (e.g. placed at the end of the flexible tape wire) exchanges data, via an I$^2$C bus 1210, with the distributed MOS drivers 1206 to independently drive the power MOS devices 1204. It is noted that one design aspect pertains to the dimensions of the power devices 1204. Such devices may need to be small enough to allow the electronics to be distributed all along the fiber but not too small to avoid high on-resistance and therefore high power consumption and heat generation. Values of about 2 mΩ·mm$^2$ seem to be the current state of the art, and with such resistance, power MOS devices 1204 can be properly scaled to fit the actuator dimensions. For example, applying to the above simulated fiber, a power MOS 1204 could be of about 0.5 mm$^2$ (e.g. die size), having a power consumption of about 1 mW, about hundred times less than the power consumption of the actuator 202 or 212.

This disclosure presents an actuator, based on the linear synchronous motor principle, whose structure dimension and manufacturing could allow the direct application as artificial muscle fiber. Developed pressure and stress-strength behavior are comparable with natural human muscle. The design implies intrinsic actuator compliance, since no gears, bearings, or other possible blocking parts are involved. Flexibility in the proposed artificial muscle fiber allows the construction of muscle bundles to obtain bio-inspired robot structure. Other device parameters, like low voltage, flexibility, scalability, etc., could allow a direct implementation in wearable robotics. The proposed design is simple, flat, includes distributed electronics, thereby allowing use of IC technology as a method of manufacture, involving both assembly processes and planar technology. The proposed design also exhibits high compliance, high pressure, low voltage, flexibility, scalability, and silent operation.

In an embodiment, an artificial muscle fiber includes: an external fiber including a first linear array of actuators having protrusions directed in a first direction; and an internal fiber including a second linear array of actuators having protrusions directed in a second direction opposite to the first direction, wherein protrusions of the first linear array of actuators and protrusions of the second linear array of actuators are separated by a non-zero gap, and wherein each actuator of the first linear array of actuators and the second linear array of actuators includes a soft magnetic material.

In an embodiment, an artificial muscle fiber includes an internal fiber and an external fiber. The internal fiber includes: a first flexible tape; a first array of actuators protruding in a first direction from a major surface of the first flexible tape; and a second array of actuators protruding in a second direction from the major surface of the first flexible tape, wherein the first direction is opposite to the second direction. The external fiber includes: an opening within which a portion of the internal fiber is positioned; a second flexible tape defining a first sidewall of the opening; a third flexible tape defining a second sidewall of the opening; a first array of actuators protruding in the second direction from a major surface of the second flexible tape towards the first array of actuators of the internal fiber; and a second array of actuators protruding in the first direction from a major surface of the third flexible tape towards the second array of actuators of the internal fiber.

In an embodiment, a method of manufacturing an actuator includes: etching a trench in a semiconductor substrate; depositing a soft magnetic material into the trench, wherein a frontside of the semiconductor substrate and a frontside of the soft magnetic material are substantially flush; forming a first plurality of vias filled with a conductive material next to a first sidewall of the soft magnetic material; forming a second plurality of vias filled with the conductive material next to a second sidewall of the soft magnetic material opposite the first sidewall; forming a first plurality of wires on the frontside of the soft magnetic material to interconnect the first plurality of vias and the second plurality of vias, the forming producing an intermediate structure; flipping the intermediate structure to expose a backside of the semiconductor substrate; planarizing the backside of the semiconductor substrate to expose a backside of the soft magnetic material; and forming a second plurality of wires on the backside of the soft magnetic material to interconnect the first plurality of vias and the second plurality of vias.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An artificial muscle fiber, comprising:
   an external fiber comprising a first linear array of actuators having protrusions directed in a first direction; and
   an internal fiber comprising a second linear array of actuators having protrusions directed in a second direction opposite to the first direction,
      wherein protrusions of the first linear array of actuators and protrusions of the second linear array of actuators are separated by a non-zero gap,
      wherein each actuator of the first linear array of actuators and the second linear array of actuators comprises a soft magnetic material,
      wherein each actuator of the first linear array of actuators and the second linear array of actuators comprises respective windings around the soft magnetic material, and
      wherein the respective windings are configured to carry electrical current for actuation of the artificial muscle fiber.

2. The artificial muscle fiber of claim 1, wherein a pitch of actuators of the first linear array of actuators is greater than a pitch of actuators of the second linear array of actuators.

3. The artificial muscle fiber of claim 1, wherein a lateral extent of the first linear array of actuators is greater than a lateral extent of the second linear array of actuators.

4. The artificial muscle fiber of claim 1, wherein the internal fiber further comprises a flexible tape, and wherein the second linear array of actuators is mechanically and electrically coupled to a portion of a major surface of the flexible tape.

5. The artificial muscle fiber of claim 4, wherein the flexible tape comprises integrated power and logic electronics for controlling switching of the second linear array of actuators.

6. The artificial muscle fiber of claim 1, wherein the external fiber and the internal fiber are configured to cooperatively function as a linear synchronous motor.

7. The artificial muscle fiber of claim 1,
   wherein the second linear array of actuators comprises a first plurality of actuators and a second plurality of actuators, a pitch of actuators of the first plurality of actuators being equal to a pitch of actuators of the second plurality of actuators, and
   wherein the first plurality of actuators is separated from the second plurality of actuators by a distance greater than the pitch of actuators of the first plurality of actuators.

8. An artificial muscle fiber, comprising:
   an internal fiber, comprising:
      a first flexible tape;
      a first array of actuators protruding in a first direction from a major surface of the first flexible tape; and
      a second array of actuators protruding in a second direction from the major surface of the first flexible tape, wherein the first direction is opposite to the second direction; and
   an external fiber, comprising
      an opening within which a portion of the internal fiber is positioned;
      a second flexible tape defining a first sidewall of the opening;
      a third flexible tape defining a second sidewall of the opening;
      a first array of actuators protruding in the second direction from a major surface of the second flexible tape towards the first array of actuators of the internal fiber; and
      a second array of actuators protruding in the first direction from a major surface of the third flexible tape towards the second array of actuators of the internal fiber.

9. The artificial muscle fiber of claim 8, wherein each actuator of the first array of actuators of the internal fiber, the second array of actuators of the internal fiber, the first array of actuators of the external fiber, and the second array of actuators of the external fiber comprises a soft magnetic material.

10. The artificial muscle fiber of claim 8, wherein each of the first flexible tape, the second flexible tape, and the third flexible tape comprises integrated power and logic electronics for controlling actuation of each actuator of the first array of actuators of the internal fiber and the second array of actuators of the internal fiber, the first array of actuators of the external fiber, and the second array of actuators of the external fiber, respectively.

11. The artificial muscle fiber of claim 8, wherein a non-zero gap is present between the first array of actuators of the internal fiber and the first array of actuators of the external fiber and between the second array of actuators of the internal fiber and the second array of actuators of the external fiber.

12. The artificial muscle fiber of claim 8, wherein the first array of actuators of the internal fiber and the second array of actuators of the internal fiber are symmetrically positioned about the first flexible tape.

13. The artificial muscle fiber of claim 8, wherein the first array of actuators of the external fiber and the second array of actuators of the external fiber are symmetrically positioned about a central longitudinal axis of the external fiber.

14. The artificial muscle fiber of claim 13, further comprising paramagnetic connectors coupling symmetrically positioned pairs of actuators of the first array of actuators of the external fiber and the second array of actuators of the external fiber.

15. An artificial muscle fiber, comprising:
   an external fiber comprising a first linear array of actuators having protrusions directed in a first direction; and
   an internal fiber comprising a second linear array of actuators having protrusions directed in a second direction opposite to the first direction, wherein protrusions of the first linear array of actuators and protrusions of the second linear array of actuators are separated by a non-zero gap, wherein each actuator of the first linear array of actuators and the second linear array of actuators comprises a soft magnetic material, and wherein a first pitch of actuators of the first linear array of actuators is greater than a second pitch of actuators of the second linear array of actuators.

16. The artificial muscle fiber of claim 15, wherein a lateral extent of the first linear array of actuators is greater than a lateral extent of the second linear array of actuators.

17. The artificial muscle fiber of claim 15, wherein the internal fiber further comprises a flexible tape, and wherein the second linear array of actuators is mechanically and electrically coupled to a portion of a major surface of the flexible tape.

18. The artificial muscle fiber of claim 17, wherein the flexible tape comprises integrated power and logic electronics for controlling switching of the second linear array of actuators.

19. The artificial muscle fiber of claim 15, wherein the external fiber and the internal fiber are configured to cooperatively function as a linear synchronous motor.

20. The artificial muscle fiber of claim 15, wherein the second linear array of actuators comprises a first plurality of actuators and a second plurality of actuators, a pitch of actuators of the first plurality of actuators and a pitch of actuators of the second plurality of actuators being equal to the second pitch, and wherein the first plurality of actuators is separated from the second plurality of actuators by a distance greater than the second pitch.

* * * * *